United States Patent
Poluboiarinov

(10) Patent No.: US 11,940,799 B2
(45) Date of Patent: Mar. 26, 2024

(54) MOBILE ROBOTS AND SYSTEMS WITH MOBILE ROBOTS

(71) Applicant: SMP ROBOTICS SYSTEMS CORP., Sausalito, CA (US)

(72) Inventor: Sergei Poluboiarinov, Dubai (AE)

(73) Assignee: SMP ROBOTICS SYSTEMS CORP., Sausalito, CA (US)

( * ) Notice: Subject to any disclaimer, the term of this patent is extended or adjusted under 35 U.S.C. 154(b) by 27 days.

(21) Appl. No.: 17/206,645

(22) Filed: Mar. 19, 2021

(65) Prior Publication Data
US 2022/0300000 A1 Sep. 22, 2022

(51) Int. Cl.
*G05D 1/02* (2020.01)
*G05D 1/00* (2006.01)
*G06V 40/16* (2022.01)

(52) U.S. Cl.
CPC .......... *G05D 1/0214* (2013.01); *G05D 1/0234* (2013.01); *G05D 1/0238* (2013.01); *G05D 1/0246* (2013.01); *G05D 1/0276* (2013.01); *G05D 1/0291* (2013.01); *G06V 40/172* (2022.01)

(58) Field of Classification Search
CPC ...... G06V 40/00; G06V 40/172; G06V 40/10; G06V 40/1347; G06V 40/16; G06V 40/168
See application file for complete search history.

(56) References Cited

U.S. PATENT DOCUMENTS

| 8,021,077 B2 | 9/2011 | Annese et al. |
| D914,779 S | 3/2021 | Poluboiarinov |
| 2003/0105534 A1* | 6/2003 | Hara .................. G05D 1/104 700/2 |
| 2016/0210512 A1* | 7/2016 | Madden ............... G06V 20/52 |
| 2017/0019744 A1* | 1/2017 | Matsumoto .......... G06V 10/147 |
| 2017/0069214 A1* | 3/2017 | Dupray ................ G08G 5/0008 |
| 2018/0222059 A1* | 8/2018 | Ragula ................. B25J 11/0005 |
| 2020/0169659 A1* | 5/2020 | Abbas ................... H04N 7/181 |
| 2021/0024100 A1* | 1/2021 | Calleija ................ G08G 1/202 |
| 2021/0063120 A1* | 3/2021 | Taveniku .............. G06V 20/52 |
| 2021/0072750 A1* | 3/2021 | Lee ..................... G06K 19/0723 |
| 2021/0311476 A1* | 10/2021 | Li ........................ B25J 11/002 |
| 2021/0325521 A1* | 10/2021 | Han ..................... G05D 1/0221 |
| 2022/0232356 A1* | 7/2022 | Christian .............. H04W 4/80 |

OTHER PUBLICATIONS https://web.archive.org/web/20171001171642/https://smprobotics.com/security_robot/.
https://web.archive.org/web/20190110162913/https://smprobotics.com/.
https://smprobotics.com/usa/new-generation-thermal-inspection-robot-starts-trial-operation/.
https://smprobotics.com/uae/robots-artificial-intelligence-system-began-operation-dubai-uae/.
https://smprobotics.com/usa/artificial-intelligence-game-changer-security-industry/.

* cited by examiner

*Primary Examiner* — Kenneth J Malkowski
*Assistant Examiner* — Carville Albert Hollingsworth, IV
(74) *Attorney, Agent, or Firm* — Edlavitch Law PLLC

(57) ABSTRACT

Improved mobile robots and systems and methods thereof, described herein, can enhance security and monitoring services of grounds and property. And, such mobile robots and systems and methods thereof can enhance policing as well as customer service and help desk functionality. In some embodiments, the mobile robots and systems and methods thereof can enhance exploration, such as space exploration.

20 Claims, 17 Drawing Sheets

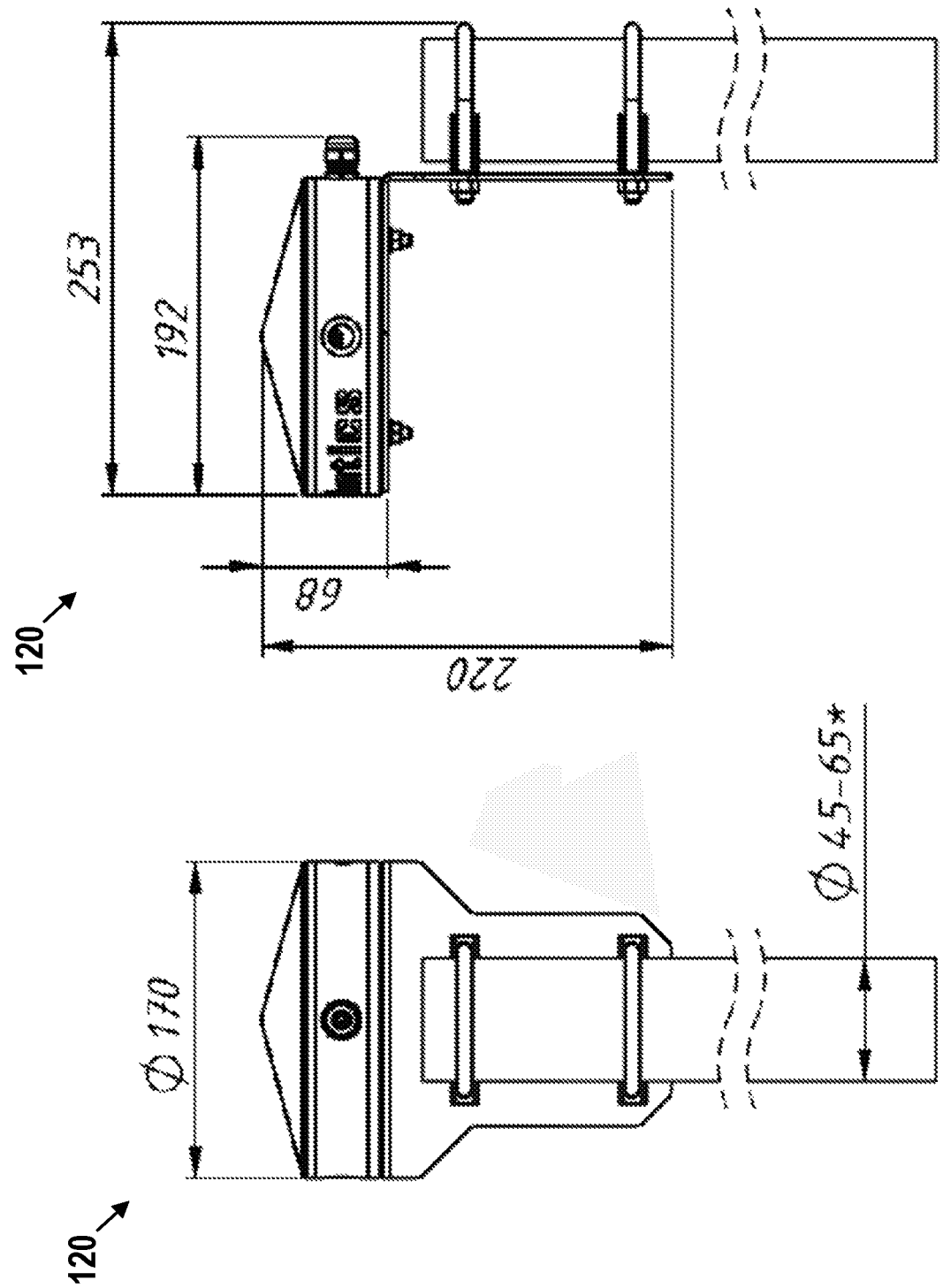

1800

MOBILE ROBOTS AND SYSTEMS WITH MOBILE ROBOTS

TECHNICAL FIELD

The present disclosure relates to mobile robots and systems having mobile robots.

BACKGROUND

Mobile robots and systems having mobile robots are well known and have existed for many years. However, there continues to be a need for improving mechanical and electrical components of such robots and systems as applications of the robots and systems expand with evolving capabilities.

SUMMARY

Described herein are improved mobile robots as well as systems having the improved robots and methods of the robots and the systems. Improved mobile robots and systems and methods thereof, described herein, can enhance security and monitoring services of grounds and property. Also, such mobile robots and systems and methods thereof can enhance policing as well as customer service and help desk functionality. In some embodiments, the mobile robots and systems and methods thereof can enhance exploration, such as space exploration.

Some embodiments of the stations can include a mobile robot, including: a power system; a sensor system, having a plurality of sensors; an actuator system powered by the power system, having a locomotion system configured to move the mobile robot from one location to another location; and a computing system, configured to: communicate with other mobile robots via a communications network; control movement of the mobile robot, via the locomotion system, according to self-governing route instructions, route instructions communicated from at least one of the other mobile robots, or a combination thereof; detect a person sensed by at least one sensor of the plurality of sensors; and control an action of the mobile robot according to the detection of the person. In some embodiments, the computing system includes a facial recognition system, and the facial recognition system is configured to match a human face from a digital image or a video frame captured by at least one sensor of the plurality of sensors against a database of faces stored in the computing system. The computing system can control the robot according to the match. For example, it can activate or control a security protocol of the robot if the match shows that an identified person should not be in the area patrolled by the robot.

With respect to some embodiments, disclosed herein are computerized methods associated with the mobile robots, as well as a non-transitory computer-readable storage medium for carrying out technical operations of the computerized methods. The non-transitory computer-readable storage medium has tangibly stored thereon, or tangibly encoded thereon, computer readable instructions that when executed by one or more devices (e.g., one or more personal computers or servers) cause at least one processor to perform a method associated with the mobile robots.

With respect to some embodiments, a system is provided that includes at least one computing device configured to provide methods associated with the mobile robots. And, with respect to some embodiments, a method is provided to be performed by at least one computing device. In some example embodiments, computer program code can be executed by at least one processor of one or more computing devices to implement functionality in accordance with at least some embodiments described herein; and the computer program code being at least a part of or stored in a non-transitory computer-readable medium.

These and other important aspects of the invention are described more fully in the detailed description below. The invention is not limited to the particular assemblies, apparatuses, methods and systems described herein. Other embodiments can be used and changes to the described embodiments can be made without departing from the scope of the claims that follow the detailed description.

BRIEF DESCRIPTION OF THE DRAWINGS

The present disclosure will be understood more fully from the detailed description given below and from the accompanying drawings of various embodiments of the disclosure.

FIGS. 14, 15, and 19 illustrate views of a GPS base station of the system of FIG. 1, in accordance with some embodiments of the present disclosure.

DETAILED DESCRIPTION OF EXAMPLE EMBODIMENTS

Figure 1:
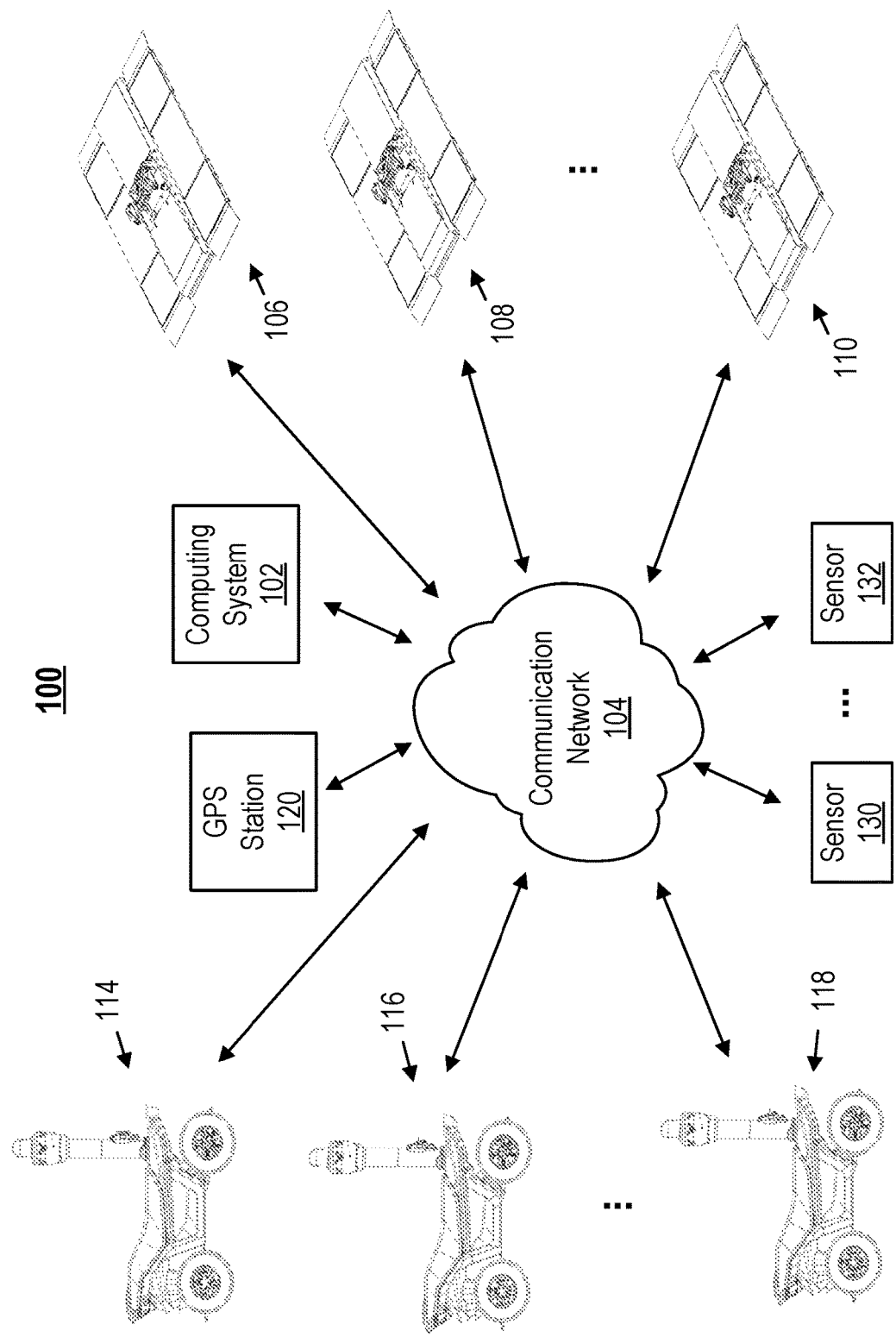
FIG. 1 illustrates a system having a computing system, multiple robot docking stations, multiple corresponding mobile robots, a GPS station, and sensors communicating over a communication network, in accordance with some embodiments of the present disclosure.

Details of example embodiments of the invention are described in the following detailed description with reference to the drawings. Although the detailed description provides reference to example embodiments, it is to be understood that the invention disclosed herein is not limited to such example embodiments. But to the contrary, the invention disclosed herein includes numerous alternatives, modifications and equivalents as will become apparent from consideration of the following detailed description and other parts of this disclosure.

Described herein is a security system having one or more security robots. A security robot of the system can include a frame and sensors attached to the frame. The robot can also include mechanical parts attached to the frame such as a powertrain and wheels driven by the powertrain. Alternatively, the robot can have legs driven by the powertrain. The sensors can include one or more video cameras configured to capture a video recording of an environment external to the apparatus. The cameras can capture videos and provide a 360 degree view of the surroundings of the robot. The cameras can include a pan-tilt-zoom camera (PTZ camera), which is a camera that is capable of remote directional and zoom control. The motion of such a camera can be controlled by an internal computer of the robot or remotely by an external control source. In some embodiments, the 360 degree view can be provided simultaneously. The robot can be autonomous and can be controlled by an autonomous motion control system. The robot can also be controlled by a remote control. Video and images captured by the sensors can be analyzed by a computer within the robot or by an external computer wirelessly connected to the internal computer of the robot. The security system can also include a communications network, a command center (which can include applications that can interact with the internal computer of the robot) and a mobile application configured to be installed and run on a mobile device (such as a smartphone). The applications installed at the command center and in mobile devices can interact with the robot over the communications network. For example, the applications can interact with the internal computer of the robot.

The internal computer of the robot can analyze images and other types of information sensed by the sensors of the robot using known computer vision methods and artificial intelligence. The internal computer can detect people within the images using a computer vision application. When the internal computer detects a person, the internal computer can compare optical features of the person against stored optical features of people. Then, according to the comparison, the robot can act accordingly. For example, if the internal computer determines from the comparison that the sensed features do not match features of a person permitted to be at a location secured by the robot, then the robot can perform a security procedure. The security procedure can include following the person, alerting an operator of the robot, sounding an alarm or notifying the person that he or she may not have security clearance. The sensors can capture features of a person after the person is detected and such features can include facial features, gait features, and voice features. Known computer vision and artificial intelligence methods can be used to detect a person and analyze features of the person. In some embodiments, the cameras can sense data that can be indicative of facial features from a person up to approximately 100 M away from the robot. The facial recognition performed by the robot can be enhanced by a government database, public database, or private database of faces of people. The internal computer of the robot, or another computer networked with the internal computer can be connected to one of such databases.

In some embodiments, the internal computer can detect whether a person is wearing a required article of clothing. For example, the internal computer can detect whether a person is wearing a facemask or not wearing a facemask. In such an example, a person is detected not wearing a required facemask, then the robot can perform a security procedure such as notify the person to put on a facemask or alert an operator of the robot.

In some embodiments, a camera of the robot can detect people who are prohibited from being in the place where the robot is moving. For this, the characteristics of these people are compared with those found in a specific database, and there is a match, a command is sent to perform a special procedure, for example, continuous tracking of a person. To do this, the internal computer gives a command to the motion control system. This mode is helpful identify and track dismissed personnel on the grounds of the operator of the robot.

The sensors of the robot can include various types of cameras. The cameras can include still and video cameras. The cameras can include thermal and optical cameras. The cameras can also include PTZ cameras. Such cameras can be remotely controlled by automation systems being in the robot or external to the robot and connected to another device or apparatus wirelessly. The sensors can include optical cameras that capture light information in the electromagnetic radiation wavelength range between 100 nm and 1 mm. The cameras can include thermal cameras, such as thermal video cameras. Such cameras can detect information in the electromagnetic radiation wavelength range between about 1,000 nm (1 µm) to about 14,000 nm (14 µm). Thermal video cameras are also known as infrared cameras.

The thermal video cameras can be used to detect people in the surroundings of the robot as well as detect heat signatures given off by the people. The heat signatures can be analyzed by the internal computer of the robot to determine a probability that a person as an elevated temperature. If the determined probability exceeds a threshold, then the robot can perform a security procedure that can include alerting an operator of the robot, sounding an alarm or notifying the person that he or she may have an elevated temperature. The thermal camera can also be used by the robot at night or when there is reduced light in the surroundings of the robot.

The sensors of the robot can also detect and analyze other types of objects besides people. The objects can be analyzed for security purposes and can also be analyzed to assist the autonomous motion control system. A sensor of the robot can sense one or more physical features of an object and then communicate corresponding data to the internal computer of the robot. The internal computer of the robot can detect the object as well as identify it according to a database of information on objects. After identifying an object and its location, the computer can control the robot accordingly. For example, it can direct the autonomous motion control system to move or stop the robot in a certain way according to the analysis. Also, for example, it can initiate or perform a security procedure.

In some embodiments, one of the cameras of the robot can be positioned at a height above the ground between a range of four and half and six and a half feet. This camera is also referred to as the main camera. The height of the position of such a camera can be adjusted to be at the height of an eye level of an average person in the geographic location. For instance, in Europe, the average height of a man is 5 ft 10 in. Thus, when the robot is deployed in a location in Europe the positioning of one of its cameras can be configured at a height of 5 ft 8 in off the ground so that the camera is situated at approximately eye-level of many men in Europe.

The main camera can be attached to a poll mechanically movable by parts of the robot and the poll can pivot automatically or with manual controls, such that the camera can provide a 360 degree view. The poll can also be a telescoping poll so that its length can be adjusted automatically or manually. This allows for the height of the camera's position to be adjusted. Adjustment can occur automatically or manually (via a remote control) when a person is detected so that the camera is position by the poll to approximately eye-level of the detected person. This can allow for more effective facial recognition.

In some embodiments, the robot can include a stroboscope to capture information on motions of objects in its surrounding environment.

In some embodiments, the robot can include a stereo camera to capture information on its surrounds in three-dimensions. The stereo camera can be connected to the motion control system, and it can provide information to the motion control system that in turn can use the information to provide obstacle avoidance for the robot while it is moving.

The robot can be configured to move according to a set of instructions. The set of instruction can include one or more routes and speeds for the robot to move at different parts of the one or more routes. The instructions can provide for waiting periods in the routes. A waiting period can include an instruction for the robot to stop and stay at a point in a route for a selected period of time or the robot can stay at the point for a period of time determined by criteria. The set of instructions can be programmed for indoor or outdoor routes.

Movement of the robot can further be controlled by information gathered from the surroundings of the robot. For example, motion detection sensors and cameras can capture information on objects and motion of objects in the robot's environment and along its routes. In some embodiments, a system having separate cameras can provide the sensing for a computer vision system that assists in the motion control of the robot. For example, some embodiments include a motion control system with eight cameras. And, in some embodiments, one or more of the eight cameras can also be used for the facial recognition and other security methods described herein.

The robot can include a speaker or be networked with a speaker within close proximity and can be configured to communicate with a detected person through the speaker. The robot can include a microphone to capture sound including voice communications from a detected person. Combined, the speaker and microphone, can be configured to provide a voice conversation between the robot and the detected person. The robot can also have part of an intercom system that can include the microphone and the speaker. The intercom system can include a network that connects the microphone and the speaker to a microphone and a speaker of a command center or an operator of the robot. In other words, people can interact with the robot through intercom communications. This can assist people in distress or people looking for directions or assistance in general.

In some embodiments, the robot can be configured to provide announcements and notices via its speakers as it moves in a route. In some embodiments, the robot can detect a person in violation of a criteria and give an audible warning to the person accordingly.

In some embodiments, after detection of a possible prohibited person, the robot can have a voice or graphical dialogue with the detected person, and the dialogue can request a personal identifier (for example, card ID, NFC key, voice ID, etc.) for the detected person. For such functionality, the robot includes a speaker and microphone. The internal computer can run a program for checking the identification of the person. The identification can be captured via a camera of the robot or via a microphone of the robot. Also, other types of sensors can capture the identification of the detected person, such as a thumb or finder print recognition sensor or a retinal scan system can be included with the robot. The microphone can be the input device for capturing a voice identification or a code or token spoken by the detected person. The camera can be the input device for capturing a code or token visually presented to the camera of the robot. The speaker of the robot or a display on the robot can provide audible or graphical instructions, respectively, to the person for identification purposes.

The system can include a mobile application that interacts with the internal computer of the robot which in turn interacts with other parts of the robot. For example, the mobile application can interact with a GPS of the robot and display a geographic position of the robot on a map on a mobile device running the mobile application.

It is to be understood that the features of the mobile application can be included in the command center application.

The system can include a command center application that interacts with the internal computer of the robot which in turn interacts with other parts of the robot. The command center application can be configured to interact or replace legacy or other types of command center applications, such command center applications found at police stations and other types of security facilities. For example, the command center application can interact with a GPS of the robot and display a geographic position of the robot on a map on a monitor of a computing system running the command center application or another type of command center application interacting with the command center application.

It is to be understood that the features of the mobile application can be included in the command center application.

In some embodiments, the mobile robot can act as an intruder (border violator) detection device. The mobile robot in this capacity includes at least one camera mounted on an autonomous mobile platform. The mobile robot can include one or more video cameras on a transport platform using any type of drive, wheeled, crawler, or walking system.

The mobile platform automatically moves on a surface under the control of an autonomous motion control system of the mobile robot. An image taken from a camera of the robot can be analyzed by one or more computers of the robot. The computer(s) detect people through a program. When a person is detected, his or her characteristics are compared with the characteristics of people who are allowed to be at the location of the device, such as via a database. If the characteristics of the detected person do not correspond to those previously recorded, the person is identified as an outsider, and then a command is issued to perform a special procedure. By characteristics is meant any description of the characteristics of an individual. For example, characteristics can include a photo of a face, peculiarities of gait, uniqueness of a voice.

The mobile robot allows its operator to detect people who are prohibited from being in the place where the device is moving. For this, the characteristics of these people are compared with those found, if they coincide, a command is sent to perform a special procedure, for example, continuous tracking of a person. To do this, the computer gives a command to the motion control system. Such a mode of the robot is used to identify dismissed personnel on the territory. A person detected by the device has the ability to authorize through a voice dialogue with the described device and the presence of a personal identifier (for example, card ID, NFC key, etc.). For this, the device computer can be equipped with a speaker and microphone. The program of identification of a person by voice allows the robot and the operator to recognize a person. The voice assistant program allows the robot or the operator to build a dialogue for performing human identification actions.

A person can be identified by an ID card by comparing the photo on it and the person's face. To do this, the person shows the ID to a camera of the robot and the program ran by the computer(s) in the robot compares the photo on the card with the person's face. The authenticity of the ID card is confirmed by reading its secret key by a transceiver installed on the robot. The identification system transceiver is connected to the robot's computer(s).

Under the control of an automatic motion control system, the robot moves throughout the territory in order to identify different kinds of objects and identify people. For large areas or difficult terrain, several robots are used. To avoid duplicate routes, robots exchange with each other about current and upcoming patrol routes.

To charge batteries, robots use automatic chargers for continuous operation without human intervention.

The mobile robot can be designed for the protection and identification of people.

The system having the robot (as shown in claim) and the mobile robot can use a method for teaching the behavior of a robot (using artificial intelligence). A computer of the robot can include software that has a learning module. In the process of work, the module can be trained by adjusting the robot's work, which is made by the operator. The interaction of the robot with the operator is carried out through a voice assistant, or through the exchange of messages in a messenger app. Also, depending on the information received from external sensors and its own sensors, the robot can make decisions accordingly on any of its actions. The decisions can be made by the robot based on previous experience or randomly using the artificial intelligence.

Before each of its actions, the robot can notify an operator of its intentions. If the operator does not cancel the intention of the robot through the voice assistant, or through the exchange of messages in the messenger, the robot performs it. In the process of execution, the robot informs about its action. If the operator does not cancel/change the action of the robot, the robot executes it.

Upon completion of an action or a series of actions, the robot can request an assessment of its actions from the operator. Evaluation of actions by the operator is used to train the software module of the robot.

If the operator canceled the action of the robot and assigned a new one, the robot performs it and uses the program module for training.

The aforesaid method can be used to train the robot to separate people into permitted actors and prohibited actors or targets or intruders. If an intruder is not recognized by the robot system, the robot can ask the operator on the action to take. If the operator selects that the identified person is allowed to be in the territory, then the robot will record information about him as a personnel. If the operator does not recognize the person, then the robot will remember it as an intrusion. For example, the robot is patrolling the area and sees a person in the distance. The robot informs the operator about the intention to drive closer. The operator does not mind. The robot drives up and recognizes the person. Requests an assessment of actions from the operator. The operator gives a positive rating. The robot's learning module is then trained using this example. And, the next time it detects a person in the distance on this patrol site, the robot will do the same. This allows an operator to fine-tune the robot's work on different parts of the route.

In some embodiments, the mobile robot can perform a method of control and monitoring of the robot by the operator. The robot can inform the operator about its state (action) or intention, through a voice assistant, or through messages in a messenger app. The robot sends a message about the beginning of its action and reports the reason for it. The operator can cancel or assign a new task for the robot through the voice assistant, or through messages in the messenger.

Also, improved mobile robots and systems and methods thereof, described herein, can use and be combined with improved robot docking stations and systems and methods thereof described in U.S. patent application Ser. No. 17/146,969, filed Jan. 12, 2021, and entitled "ROBOT DOCKING STATIONS", the entire disclosure of which application is hereby incorporated herein by reference. For example, FIG. 1 shows a system 100 having a computing system 102, multiple robot docking stations and multiple corresponding mobile robots communicating over a communication network 104, in accordance with some embodiments of the present disclosure.

As shown in FIG. 1, system 100 includes at least one computing system (e.g., see computing system 102), a communication network 104, robot docking stations (e.g., see robot docking stations 106, 108, and 110) and mobile robots (e.g., see mobile robots 114, 116, and 118). The docking stations and the robots are shown communicating with computing system 102 and with each other through the communication network 104. Not shown in FIG. 1, the docking stations and robots of the system 100 can each include its own computing system. Such computing systems can include a processor, memory, a communication interface and one or more sensors that can make the different devices individual computing devices. In the case of the communication network 104 including the Internet, the devices (e.g., see computing system 102, robot docking stations 106, 108, and 110, and mobile robots 114, 116, and 118) can be considered Internet of Things (IoT) devices.

The robot docking stations (e.g., see robot docking stations 106, 108, and 110) can be or include any one or more of the robot docking stations described in U.S. patent application Ser. No. 17/146,969, filed Jan. 12, 2021, and entitled "ROBOT DOCKING STATIONS".

In the system 100, a mobile robot, such as mobile robot 114, can include an electrical charging port and a plurality of wheels configured to move the robot. Also, in the system 100, a robot docking station, such as robot docking station 106, can include a wheel guide system that has a horizontal portion having a plurality of plates. The plurality of plates can be positioned to correspond to the plurality of wheels of the mobile robot. In the system 100 and in some other embodiments, the plurality of plates includes four plates, and in such embodiments the corresponding robot has four wheels.

The robot docking station can also include a sensor, configured to sense when the plurality of wheels is positioned over the plurality of plates as well as an electrical charger assembly having electrical contacts and being configured to move into a charging position when the sensor senses the plurality of wheels is positioned over the plurality of plates. The charger assembly can also be configured to mate the electrical contacts with the electrical charging port of the mobile robot when the plurality of wheels of the robot is positioned over the plurality of plates. In some embodiments, the electrical charger assembly is configured to move out of the charging position when the mobile robot is charged past a charging threshold. In some other embodiments, the electrical charger assembly is configured to move out of the charging position when the sensor or a second sensor of the docking station senses the plurality of wheels of the mobile robot moving off of the plurality of plates.

In the system 100, the wheel guide system of a docking station can include lateral guide rails arranged lateral to the horizontal portion of the station and configured to prevent the plurality of wheels of the mobile robot from moving sideways off the horizontal portion once at least some of the plurality of wheels have moved onto the horizontal portion. In some embodiments, the wheel guide system can include a bridge structure, having a horizontal portion, an on-ramp at a front end of the horizontal portion, and an off-ramp at a rear end of the horizontal portion.

In the system 100, a robot docking station can include a charger housing, configured to cover and hold the electrical charger assembly and having a top wall and an opening in the top wall. Such a station can also include a movable plate configured to move away from the opening horizontally, by a plate actuator, when the sensor senses the plurality of wheels of the mobile robot is positioned over the plurality of plates as well as move over the opening, by the plate actuator, when the sensor or a second sensor of the robot docking station senses that the plurality of wheels of the mobile robot is moving off of the plurality of plates. In such embodiments of a robot docking station, the electrical charger assembly can include a vertical actuating part configured to move the electrical contacts of the charger assembly out of the charger housing upwardly through the opening, when the sensor senses the plurality of wheels of the mobile robot is positioned over the plurality of plates. And, the vertical actuating part can also be configured to move the electrical contacts into the charger housing downwardly through the opening, when the sensor or the second sensor senses the plurality of wheels of the mobile robot is moving off of the plurality of plates.

In system 100, a robot docking station can also include a charger housing and the housing can include side walls arranged to prevent the plurality of wheels of the mobile robot from moving sideways over the top wall of the housing once at least part of the plurality of wheels has moved onto the horizontal portion of the wheel guide system.

The communication network 104 can include one or more local area networks (LAN(s)) or one or more wide area networks (WAN(s)). The communication network 104 can include the Internet or any other type of interconnected communications network. The communication network 104 can also include a single computer network or a telecommunications network. More specifically, the communication network 104 can include a local area network (LAN) such as a private computer network that connects computers in small physical areas, a wide area network (WAN) to connect computers located in different geographical locations, or a middle area network (MAN) to connect computers in a geographic area larger than that covered by a large LAN but smaller than the area covered by a WAN.

At least each shown component of the system 100 (including computing system 102, communication network 104, robot docking stations 106, 108, and 110, and mobile robots 114, 116, and 118) can be or include a computing system which can include memory that can include media. The media can include or be volatile memory components, non-volatile memory components, or a combination of thereof. In general, each of the computing systems can include a host system that uses memory. For example, the host system can write data to the memory and read data from the memory. The host system can be a computing device that includes a memory and a data processing device. The host system can include or be coupled to the memory so that the host system can read data from or write data to the memory. The host system can be coupled to the memory via a physical host interface. The physical host interface can provide an interface for passing control, address, data, and other signals between the memory and the host system.

FIG. 1 also shows the system 100 having a GPS base station (e.g., see GPS base station 120). The GPS base station provides GPS support to the navigation system so of the mobile robots of the system 100. And, features of the GPS base station are described in more detail herein, such as the descriptions of the GPS base station with respect to FIGS. 14 to 17, and FIG. 19.

Figure 2:
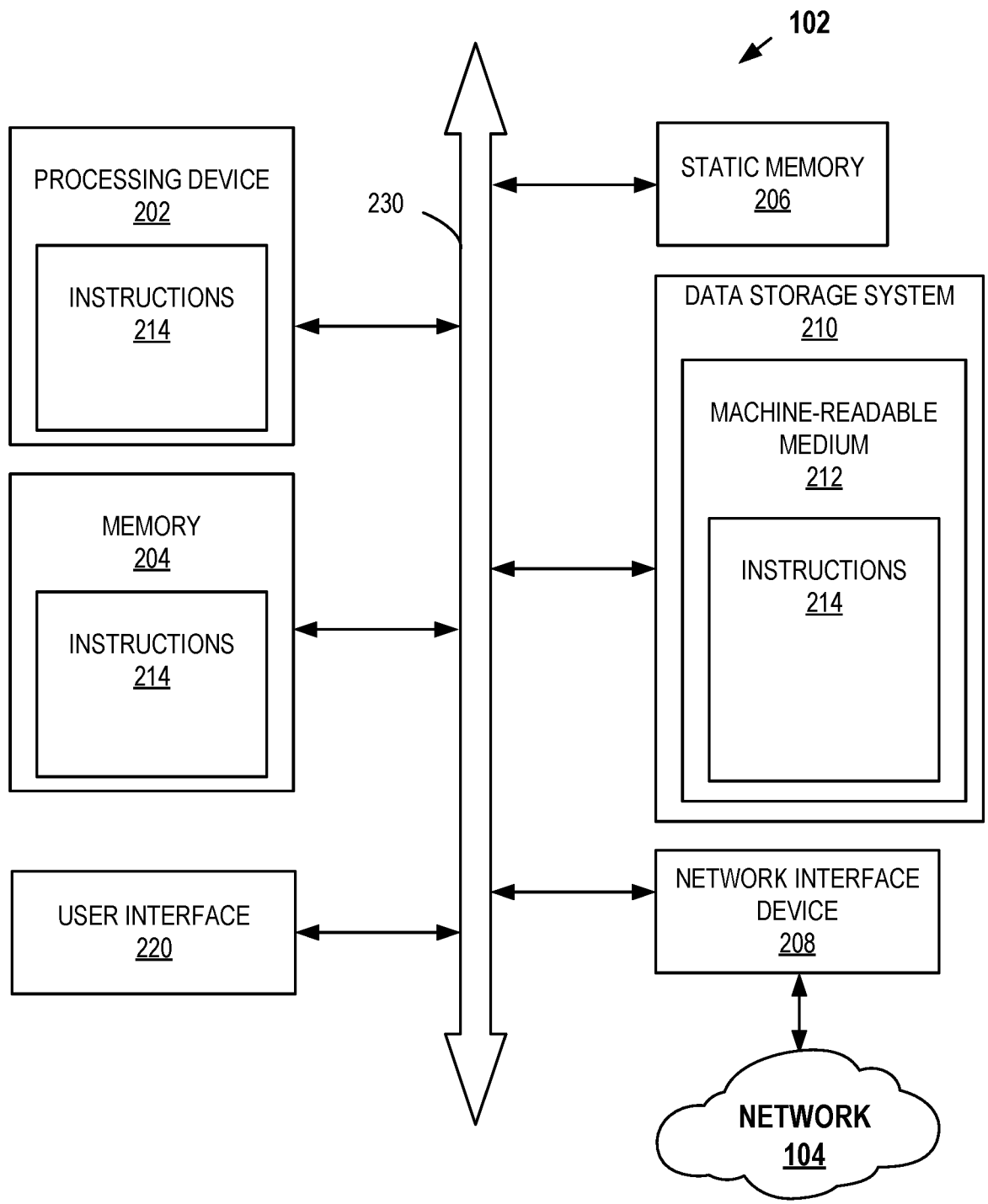
FIG. 2 illustrates is a block diagram of example aspects of the computing system shown in FIG. 1, in accordance with some embodiments of the present disclosure.

FIG. 2 is a block diagram of example aspects of the computing system 102. The computing system 102 can be a computing system external to the mobile robots in the system 100 or it can represent a computing system within a mobile robot of the system 100.

FIG. 2 illustrates parts of the computing system 102 within which a set of instructions, for causing the machine to perform any one or more of the methodologies discussed herein, can be executed. In some embodiments, the computing system 102 can correspond to a host system that includes, is coupled to, or utilizes memory or can be used to perform the operations performed by any one of the computing devices, data processors, user interface devices, and sensors described herein. In alternative embodiments, the machine can be connected (e.g., networked) to other machines in a LAN, an intranet, an extranet, or the Internet. The machine can operate in the capacity of a server or a client machine in client-server network environment, as a peer machine in a peer-to-peer (or distributed) network environment, or as a server or a client machine in a cloud computing infrastructure or environment. The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The computing system 102 includes a processing device 202, a main memory 204 (e.g., read-only memory (ROM), flash memory, dynamic random-access memory (DRAM), etc.), a static memory 206 (e.g., flash memory, static random-access memory (SRAM), etc.), and a data storage system 210, which communicate with each other via a bus 230.

The processing device 202 represents one or more general-purpose processing devices such as a microprocessor, a central processing unit (CPU), or the like. More particularly, the processing device can be a microprocessor or a processor implementing other instruction sets, or processors implementing a combination of instruction sets. The processing device 202 can also be one or more special-purpose processing devices such as an application specific integrated circuit (ASIC), a field programmable gate array (FPGA), a digital signal processor (DSP), network processor, a graphics processing unit (GPU), or the like. The processing device 202 is configured to execute instructions 214 for performing the operations discussed herein. The computing system 102 can further include a network interface device 208 to communicate over the communication network 104 shown in FIG. 1.

The data storage system 210 can include a machine-readable storage medium 212 (also known as a computer-readable medium) on which is stored one or more sets of instructions 214 or software embodying any one or more of the methodologies or functions described herein. The instructions 214 can also reside, completely or at least partially, within the main memory 204 or within the processing device 202 during execution thereof by the computing system 102, the main memory 204 and the processing device 202 also constituting machine-readable storage media.

In some embodiments, the instructions 214 include instructions to implement functionality corresponding to any one of the computing devices, data processors, user interface devices, I/O devices, and sensors described herein. While the machine-readable storage medium 212 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Also, as shown, computing system 102 includes user interface 220 that can include a display and implement functionality corresponding to any one of the user interface devices disclosed herein. A user interface, such as user interface 220, or a user interface device described herein can include any space or equipment where interactions between humans and machines occur. A user interface described herein can allow operation and control of the machine from a human user, while the machine can simultaneously provide feedback information to the user. Examples of a user interface (UI), or user interface device include the interactive aspects of computer operating systems (such as graphical user interfaces), machinery operator controls, and process controls. A UI described herein can include one or more layers, including a human-machine interface (HMI) that interfaces machines with physical input hardware such as keyboards, mice, or pads, and output hardware such as monitors, speakers, and printers. Such a UI can also include a device that implements an HMI—also known as a human interface device (HID). Additional UI layers can be included in UI described herein including tactile UI (touch), visual UI (sight), auditory UI (sound), olfactory UI (smell), and gustatory UI (taste). Such a UI can also include composite user interfaces (CUIs), which are UIs that interact with two or more human senses. In some embodiments, a graphical user interface (GUI), which is composed of a tactile UI and a visual UI capable of displaying graphics, or any other type of UI can present information related to controlling of operating clearance between a concave assembly and a crop processing rotor to a user of the system. Sound can also be added to a GUI, such that the UI is a multimedia user interface (MUI) can provide control boundaries for controlling operating clearance between a concave assembly and a crop processing rotor to the user via visual and audio means. UI described herein can also include virtual reality or augmented reality aspects.

Figure 3:
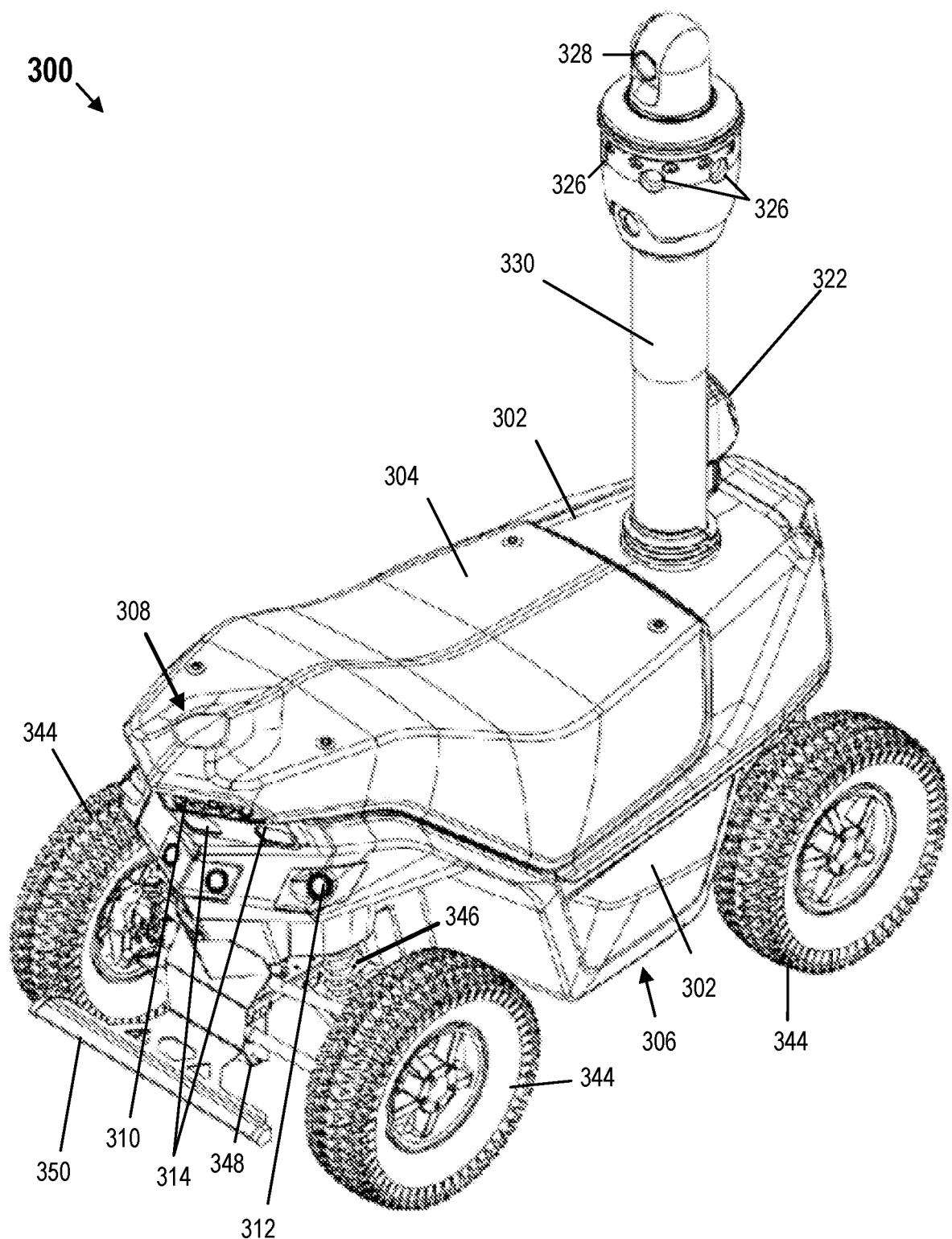
FIG. 3 illustrates a perspective view of a robot of the system of FIG. 1, in accordance with some embodiments of the present disclosure.
Figure 4:
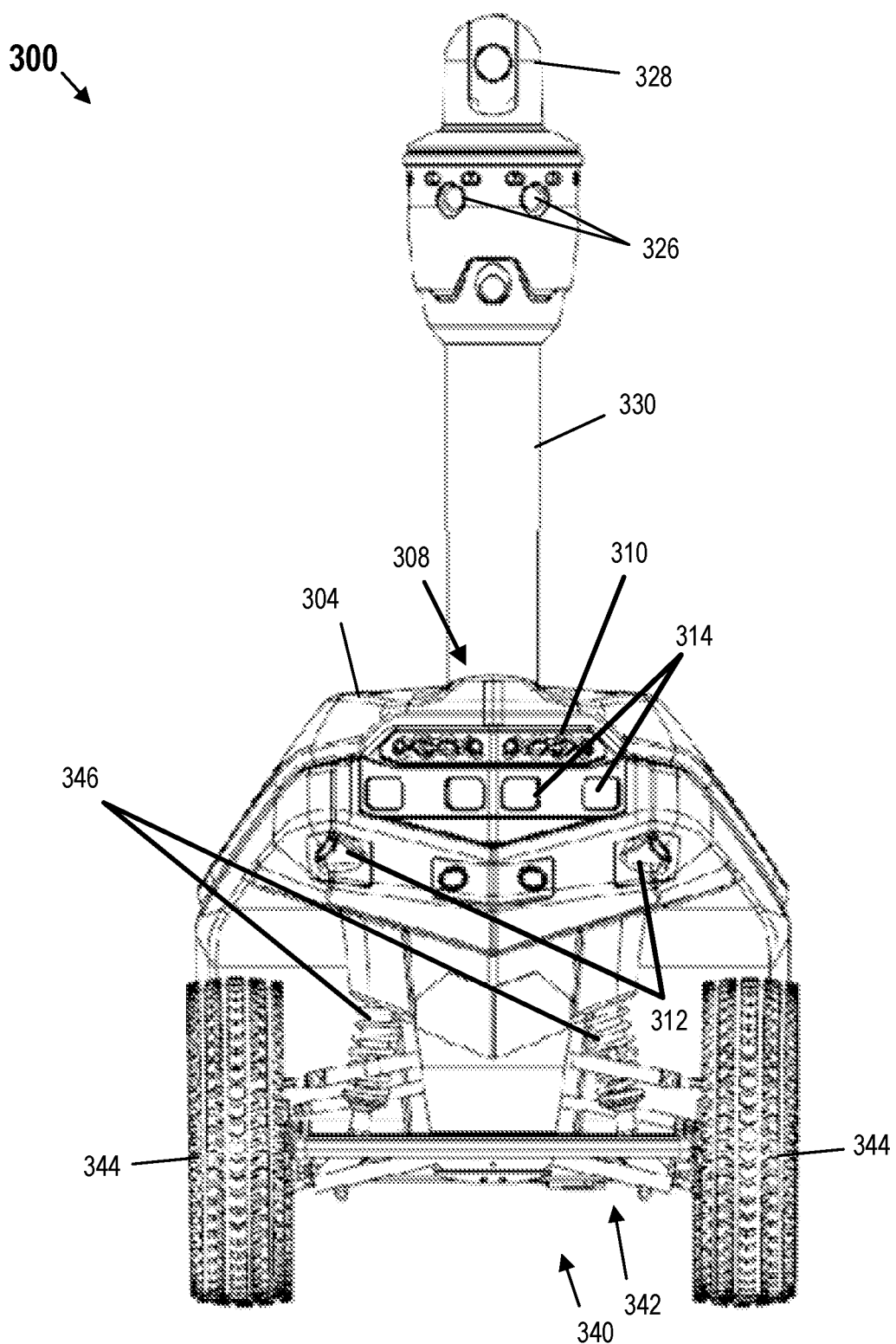
FIG. 4 illustrates a front view of a robot of the system of FIG. 1, in accordance with some embodiments of the present disclosure.
Figure 5:
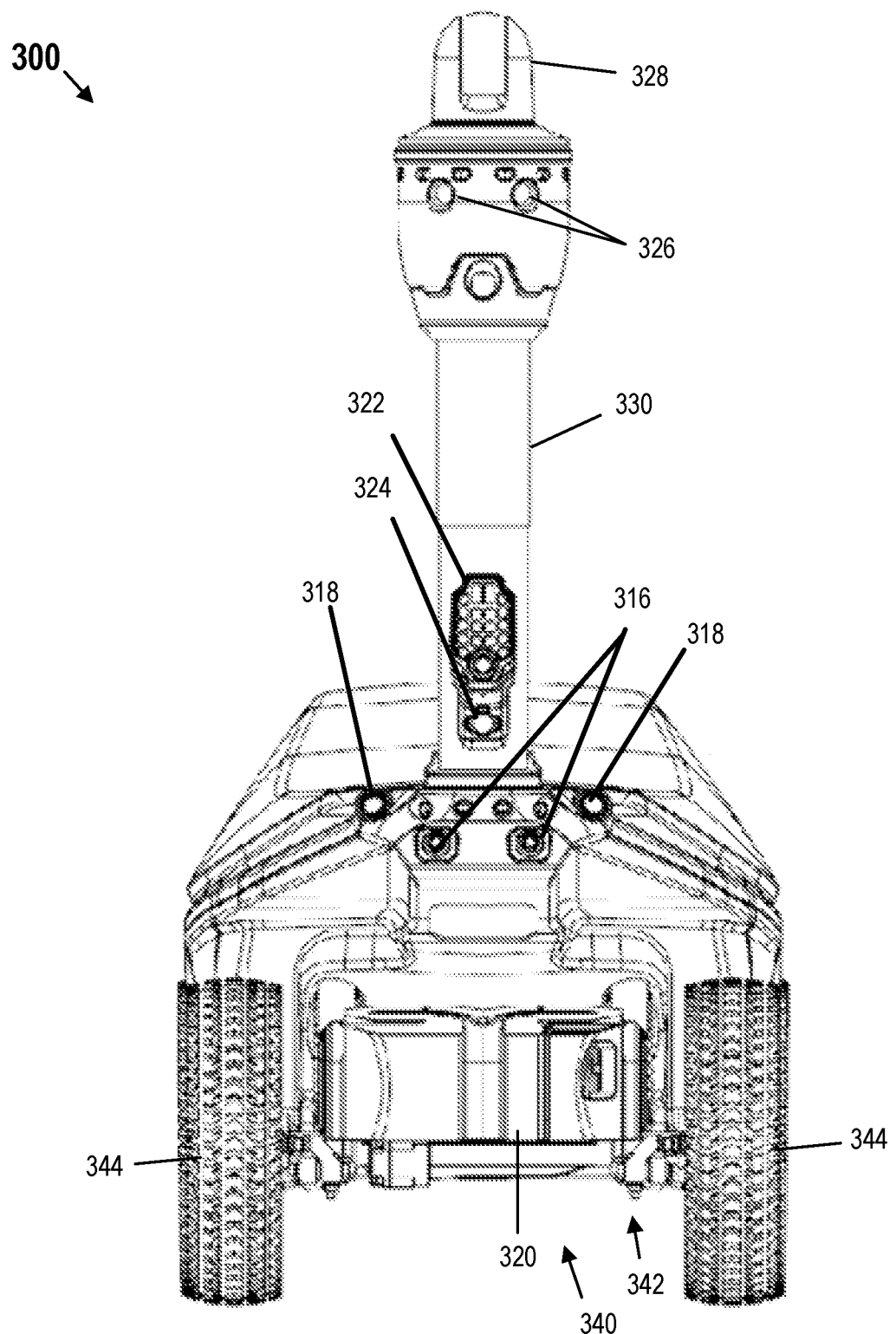
FIG. 5 illustrates a rear view of a robot of the system of FIG. 1, in accordance with some embodiments of the present disclosure.
Figure 6:
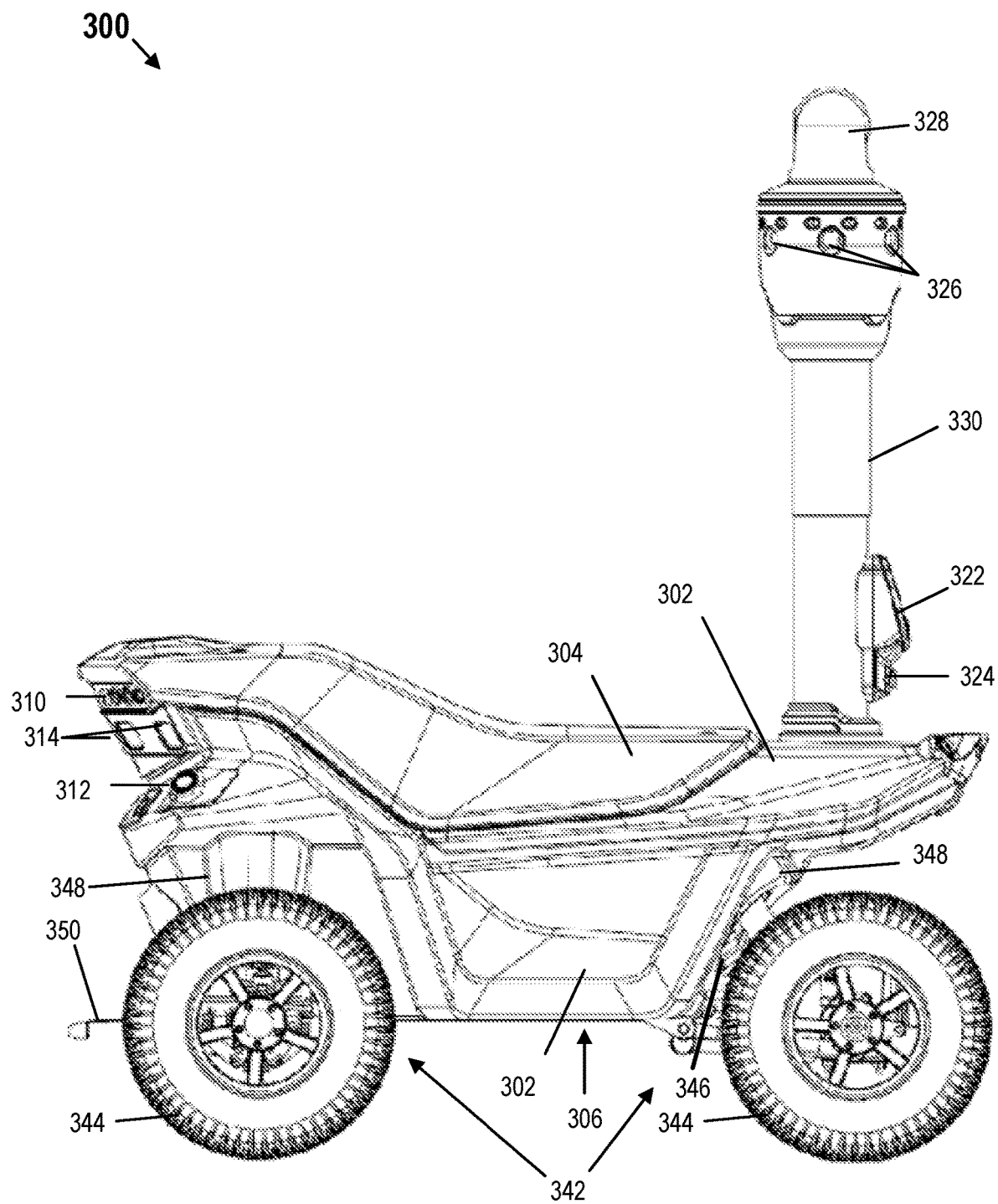
FIG. 6 illustrates a side view of a robot of the system of FIG. 1, in accordance with some embodiments of the present disclosure.
Figure 7:
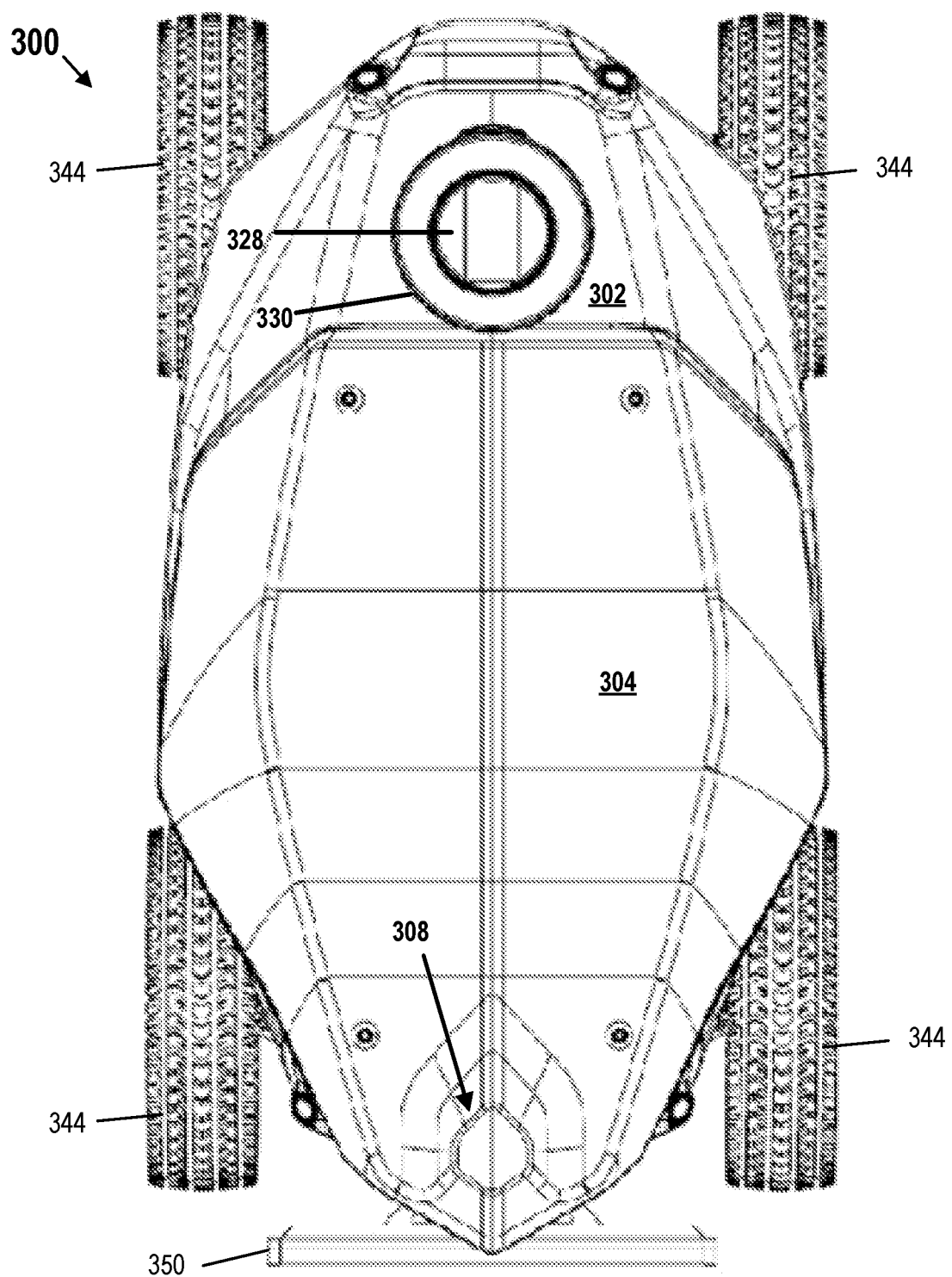
FIG. 7 illustrates a top view of a robot of the system of FIG. 1, in accordance with some embodiments of the present disclosure.
Figure 8:
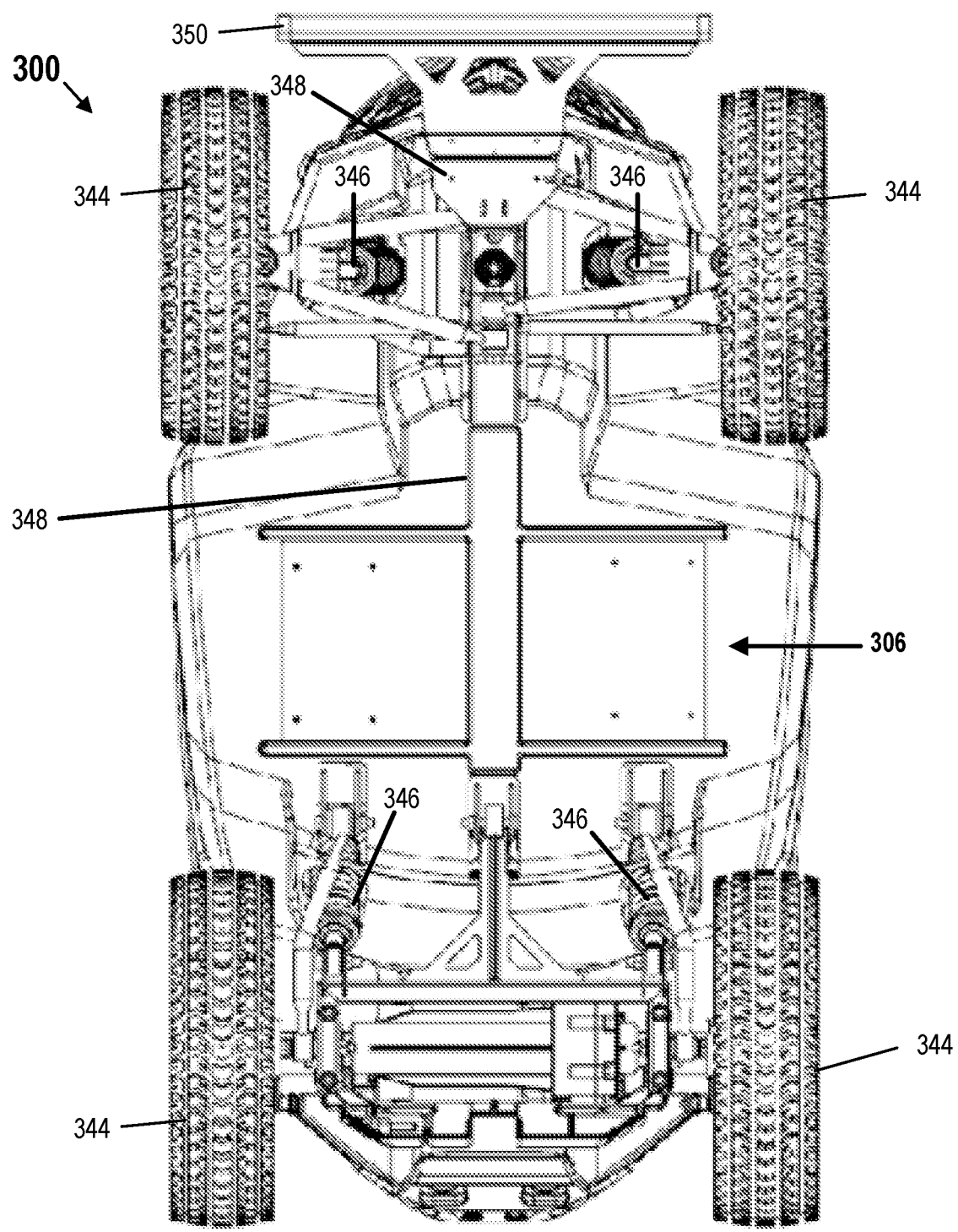
FIG. 8 illustrates a bottom view of a robot of the system of FIG. 1, in accordance with some embodiments of the present disclosure.
Figure 9:
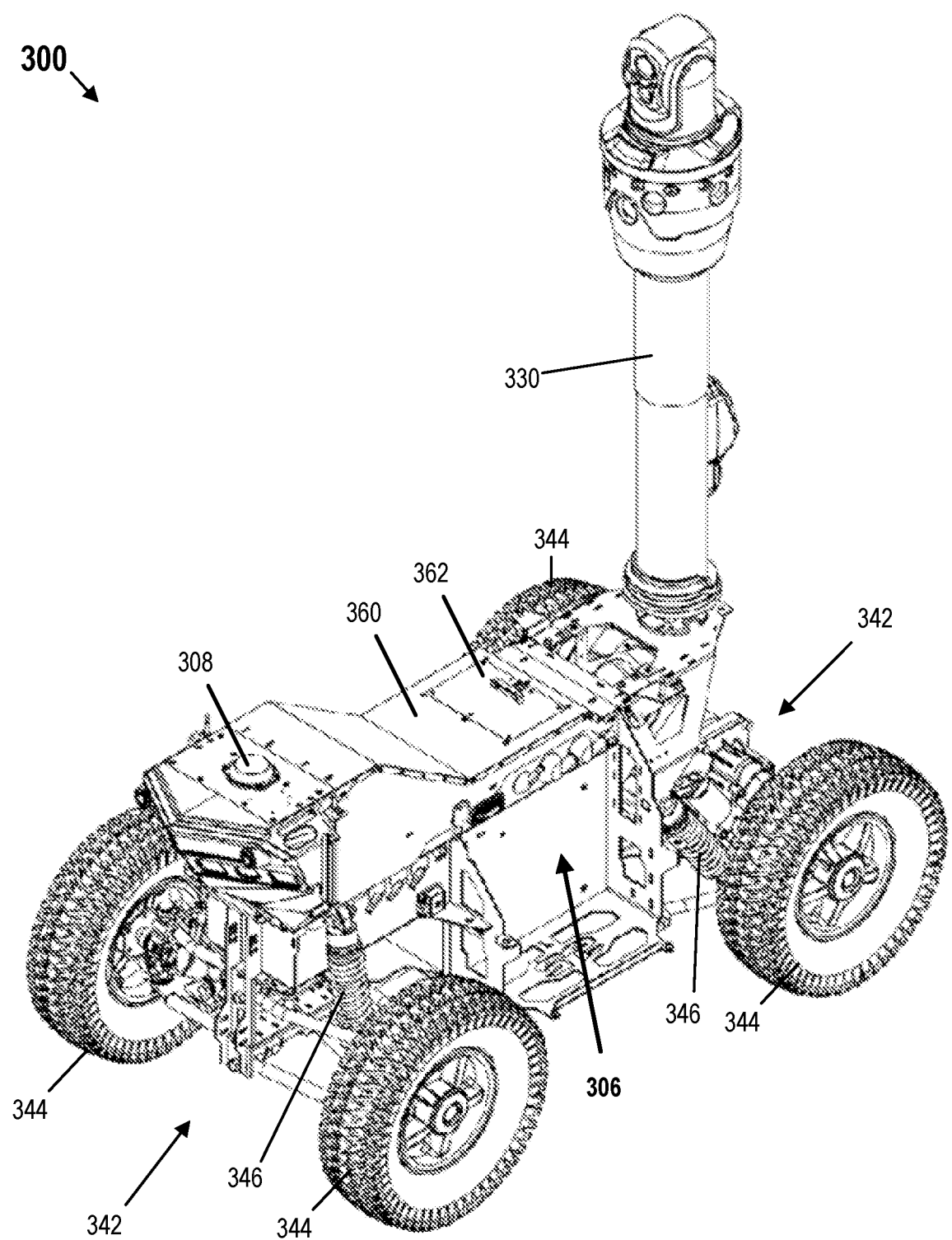
FIG. 9 illustrates another perspective view of a robot of the system of FIG. 1, with some portions of the robot being broken away to reveal internal details of construction, in accordance with some embodiments of the present disclosure.
Figure 10:
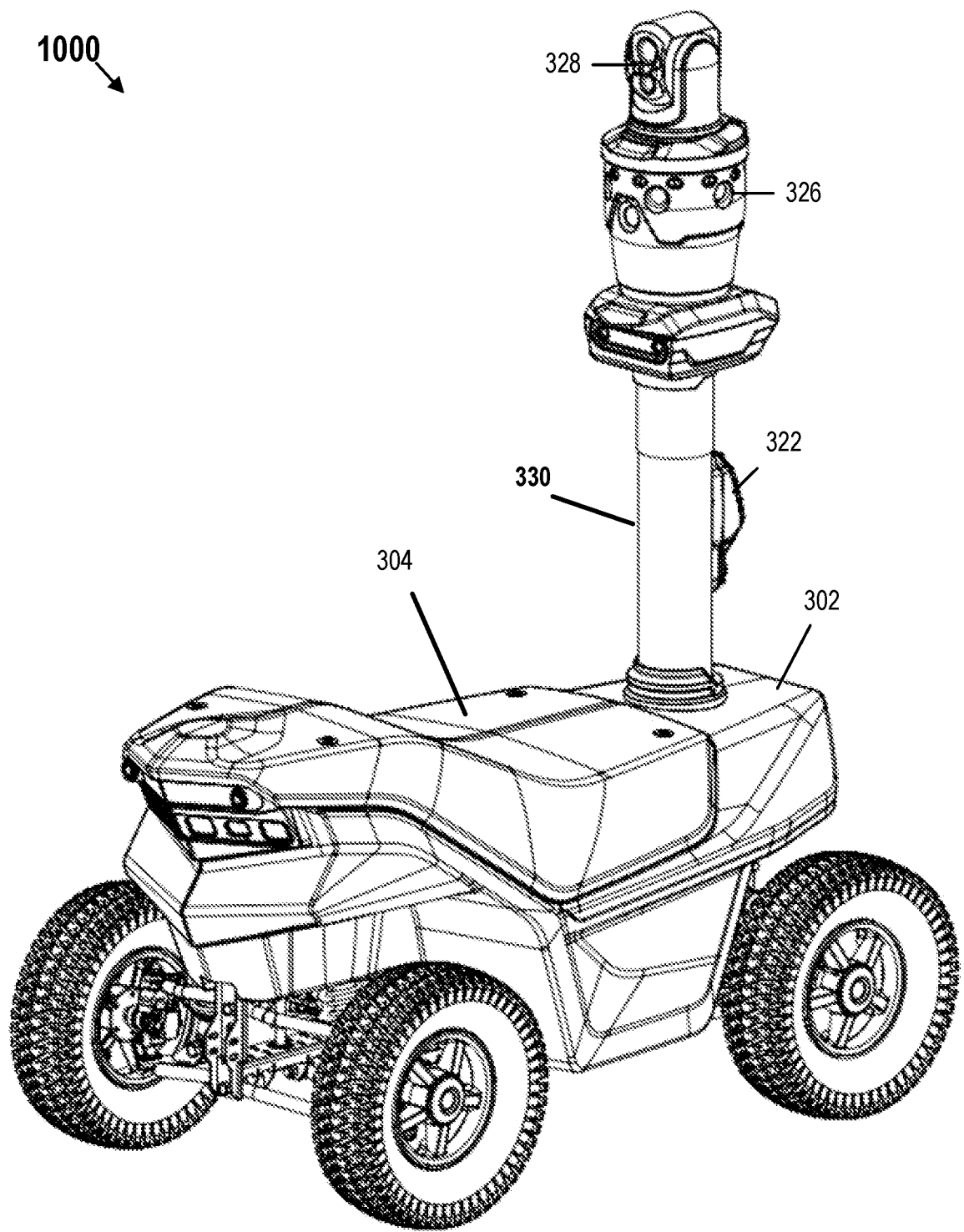
FIG. 10 illustrates a perspective view of another version of a robot of the system of FIG. 1, in accordance with some embodiments of the present disclosure.
Figure 11:
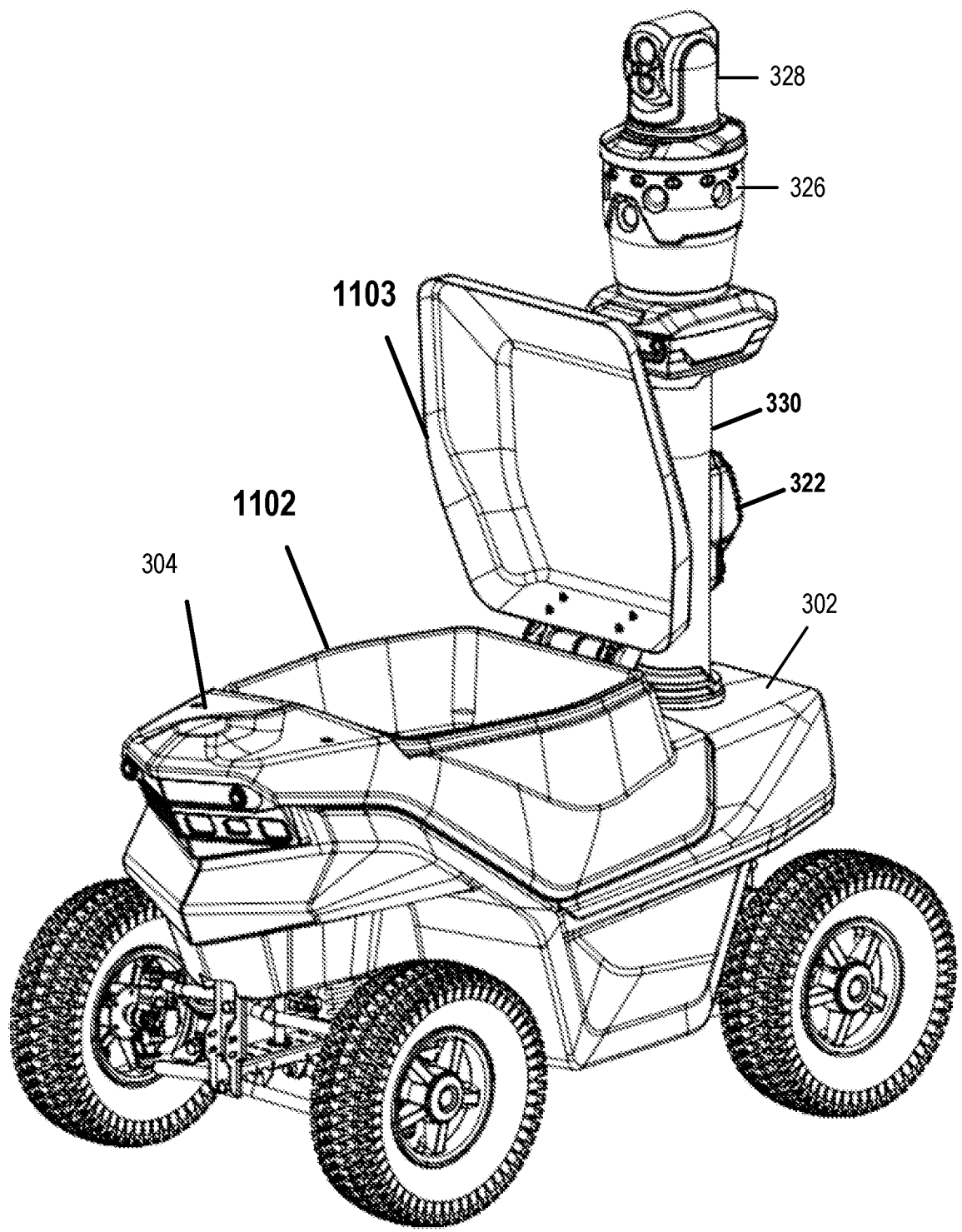
FIG. 11 illustrates a perspective view of yet another version of a robot of the system of FIG. 1, having a container, in accordance with some embodiments of the present disclosure.

FIG. 3 illustrates a perspective view of a mobile robot 300, which can be a mobile robot in the system 100. The mobile robot 300 is just one of many different versions of a mobile robot that can operate within the system 100. FIG. 4 illustrates a front view of the mobile robot 300. FIG. 5 illustrates a rear view of the mobile robot 300. FIG. 6 illustrates a side view of the mobile robot 300. FIG. 7 illustrates a top view of the mobile robot 300. FIG. 8 illustrates a bottom view of the mobile robot 300. FIG. 9 illustrates another perspective view of the mobile robot 300, with some portions of the robot being broken away to reveal internal details of construction. FIG. 10 illustrates a perspective view of another version of a mobile robot, mobile robot 1000. As shown, the form of the surveillance tower 330 for the mobile robot 300 and the mobile robot 1000 varies slightly. Also, at least the sensors on the front of the robot 1000 vary from the sensors on the front of the robot 300. This shows how the robots can vary from each other, and further variations of the robot will be described herein. Such variations can be attributed to a robot's application or common tasks. FIG. 11 illustrates a perspective view of another version of a mobile robot, mobile robot 1100. Mobile robot 1100 is similar to robot 1000 except it includes a container 1102 that has a container lid 1103 connected to the container for opening and closing the container. The container 1102 is an example modification to a robot of the system 100, such that the robot can perform particular applications, such as a delivery service. The container 1102 can store an item to be delivered by the robot 1100.

In general, a mobile robot of the system 100 (e.g., see mobile robot 300) can include a housing (e.g., see housing 302). The housing can be integrated with a housing cover (e.g., see housing cover 304) to cover features of the robot within the housing or at least under the housing. A mobile robot of the system 100 can also include a power system (e.g., see power system 306 which is more clearly shown in FIG. 9). The power system can be within the housing or external to the housing depending on the embodiment and the functional needs of the robot.

A robot of the system 100 can also include a sensor system. The sensor system can have a plurality of sensors or transducers (e.g., see front infrared lighting 310, front ultrasound sensors 312—for instance, the front ultrasound sensors can be used for obstacle avoidance during forward movement of the robot, front cameras 314, rear cameras 316, rear ultrasound sensors 318—for instance, the rear ultrasound sensors can be used for obstacle avoidance during reverse movement of the robot, six panoramic 360 degrees cameras 326, and thermal PTZ camera 328). In some embodiments, as shown in FIGS. 3 to 11, the six panoramic 360 degrees cameras 326 and thermal PTZ camera 328 are integrated on a surveillance tower (e.g., see surveillance tower 330). In some embodiments, the surveillance tower can telescope toward the housing of the robot or expand upwards. In such examples, the tower can have telescoping cylinders that make up a majority of the height of the tower.

Additionally, the robot of the system 100 can include a navigation system that includes a navigation receiver (e.g., see navigation receiver 308). The navigation system can include GPS hardware and software and can be integrated or communicatively coupled with the computing system 102 or any other computing system of the robot or that interacts with the robot. The navigation receiver can be or include a global navigation satellite system (GNSS) receiver. And the navigation system can include a GNSS system that can include components for interacting with GPS GLONASS, Galileo or BeiDou, or any other type of satellite navigation system, or any combination thereof.

A robot of the system 100 can also include a speaker and an intercom (e.g., see intercom 322). The speaker can be built into the intercom. For example, the speaker can be a part of intercom 322. A microphone can be built into the intercom. For example, a microphone can be a part of intercom 322. And as shown in some of the figures, the intercom can include an intercom panic button (e.g., see intercom panic button 324 shown in FIGS. 5 and 6). Also, in some embodiments the intercom, such as intercom 322, can include a near-field communication (NFC) transceiver (such as an NFC transceiver built into the intercom). The NFC transceiver can be useful in that it can be configured with the computing system of the robot to identify objects or people near the robot through NFC communications as long as such objects or people have an NFC tag to interact with or be read by the NRC transceiver and the computing system.

A robot of the system 100 can also include an actuator system (e.g., see actuator system 340) powered by the power system including a locomotion system (e.g., see locomotion system 342) configured to move the mobile robot from one location to another location. The locomotion system can include wheels (e.g., see wheels 344) and a suspension system having struts (e.g., see struts 346). The locomotion system can also include a transaxle and a corresponding transaxle cover that covers at least part of the transaxle (e.g., see transaxle and transaxle cover 320).

The robot can also include a chassis (e.g., see chassis 348) that is configured to support the actuator system. In some embodiments, at least the suspension system, the transaxle, and the wheels are connected to the chassis. Also, a front bumper or a rear bumper can be attached to the chassis (e.g., see front bumper 350). The front bumper or the rear bumper can include a sensor, such as a pressure sensor, piezoelectric sensor, accelerometer, etc., to make the bumper a sensing bumper that can detect when it has bumped into an object. Such sensors as well as a bumper of the robot can be included in the plurality of sensors of the sensor system of the robot. Also, a speaker can be attached to the chassis in some embodiments, such as under the rear cameras (e.g., see rear cameras 316).

Although not depicted, the mobile robot 300 includes a computing system within it. The computing system of mobile robot 300 or of another variation of a robot of the system 100 can be or be a variation of the computing system 102. As mentioned herein, the computing system 102 can be remote to the robot or within the robot depending on the embodiment of the robot. The computing system of a mobile robot of the system 100 including mobile robot 300 can be configured to communicate with other mobile robots via a communications network (e.g., see network 104). The computing system can also be configured to control movement of the mobile robot, via the locomotion system (e.g., see locomotion system 342) of the robot, according to self-governing route instructions, route instructions that can be communicated from at least one of the other mobile robots of the system 100, or a combination thereof. The computing system can also be configured to detect a person sensed by at least one sensor of the plurality of sensors of the robot. The computing system can also be configured to control an action of the mobile robot according to the detection of the person.

In some embodiments, wherein the computing system is in the robot it can be in its own housing (e.g., see housing 360 shown in FIG. 9) within the robot. Also, the computing system housing can have a hatch or door for accessing the computing system within the robot or for accessing a media storage device, such as a storage device that can store images and/or video taken from one of the cameras of the robot such as a PTZ camera. In FIG. 9, shown is a hatch 362 that provides access to a media storage device. And, the storage device can store images and/or video taken from one or more of the cameras of the robot such as a PTZ camera of the robot.

In some embodiments, the computing system has a facial recognition system, and the facial recognition system is configured to match a human face from a digital image or a video frame captured by at least one sensor of the plurality of sensors of the robot against a database of faces stored in the computing system. The database and the computing system can be a part of the robot, so time is not wasted on communicating data over a network to perform the facial recognition processing.

Figure 12:
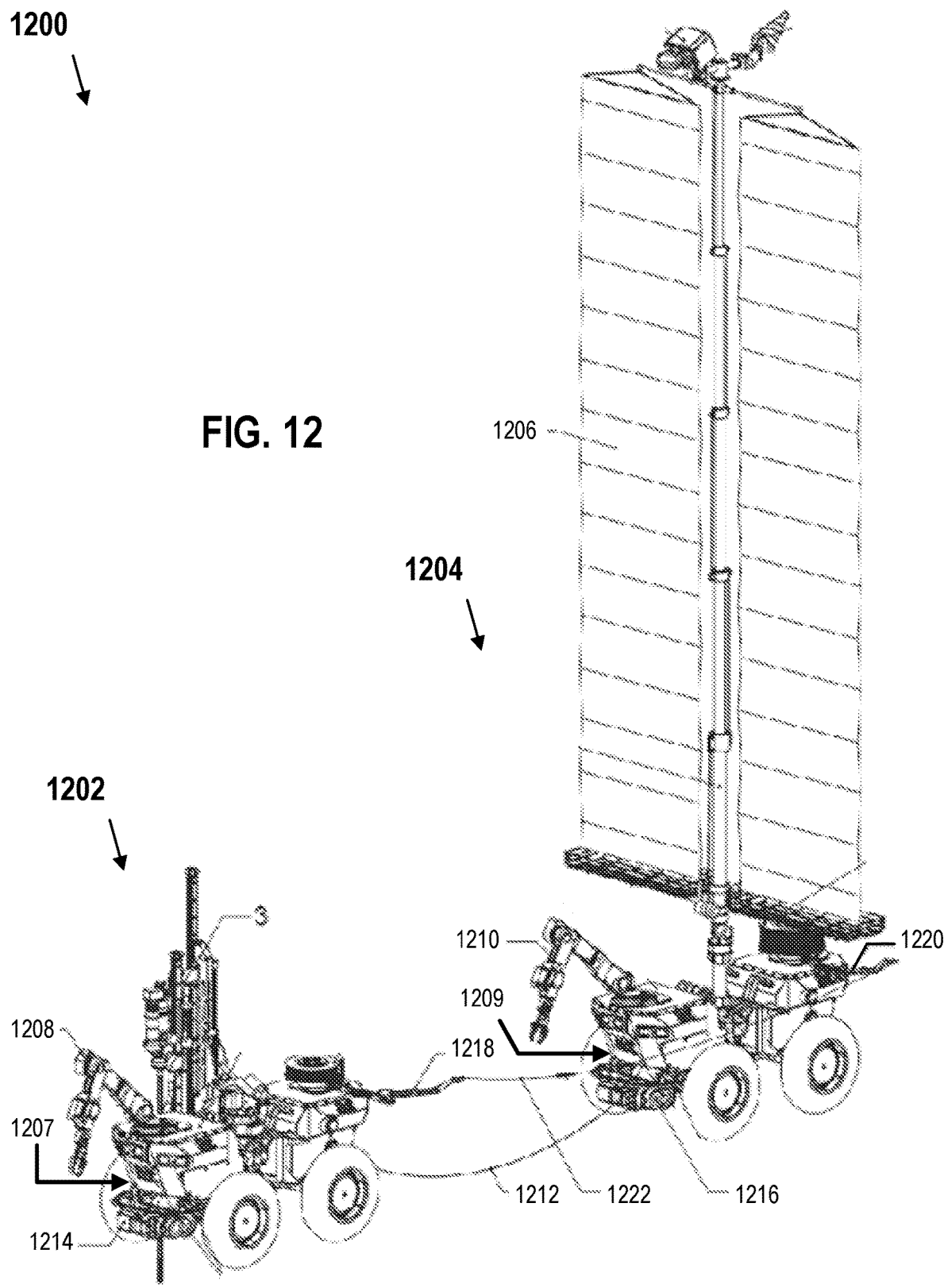
FIGS. 12 and 13 illustrate perspective views of yet another version of a robot of the system of FIG. 1, configured for exploration—such as space exploration, in accordance with some embodiments of the present disclosure.
Figure 13:
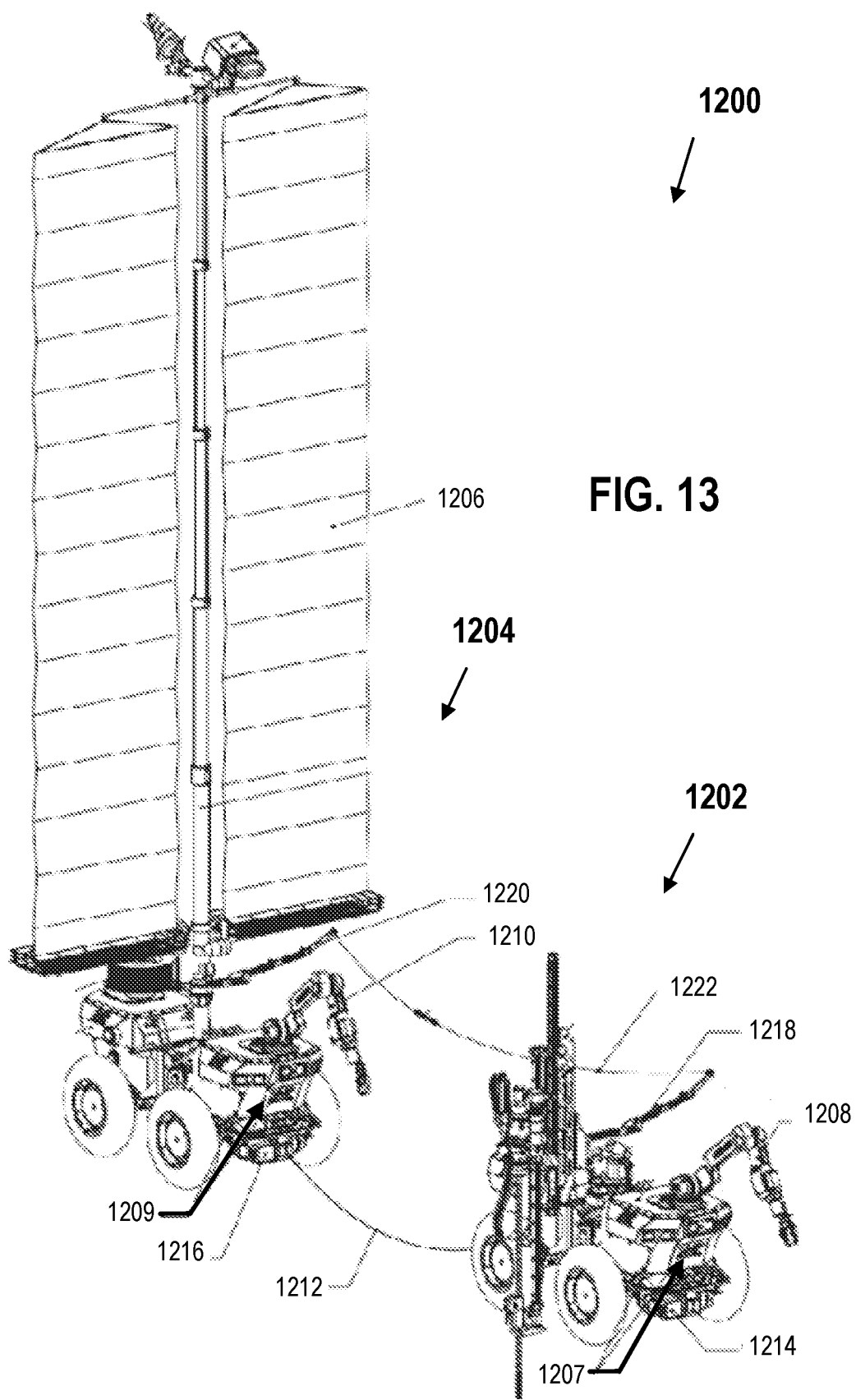

In some embodiments, the mobile robots of the system can include at least some instances of the same version of the mobile robot (e.g., see mobile robots 114, 116, and 118 of FIG. 1, which appear to be the same version of the mobile robot). Also, the mobile robots of the system 100 can include at least one variant of the mobile robot (e.g., see FIGS. 12 and 13, wherein a group of robots 1200 include a first robot 1202 and a second robot 1204 that has solar panels 1206 on a retractable mast, and wherein the solar panels can include transducers attached to the panels or the mast—e.g., piezoelectric sensors for sensing wind speeds, etc. for exploration). The solar panels 1206 on the retractable mast are foldable such that a structure supporting the panels can expand and retract with the mast.

In some embodiments, a group patrol algorithm controls generation of route instructions for a mobile robot and the other mobile robots in the system 100. The generated route instructions can be communicated via the communications network (e.g., see network 104). And, the communications network can include the mobile robot and the other mobile robots as nodes of the communications network (e.g., see the robots and docking stations and network 104 shown in FIG. 1). In some embodiments, the communications network can include a peer-to-peer network and the mobile robot and the other mobile robots are peers in the peer-to-peer network.

In some embodiments, the computing system is configured to generate the self-governing route instructions or route instructions for the other mobile robots via machine learning, deep learning, or a combination thereof. In such embodiments and other, the computing system can be configured to generate the self-governing route instructions or route instructions for the other mobile robots according to surroundings information sensed from at least one sensor of the plurality of sensors of the robot. The surroundings information can include a distance to a new route or a specific geographic location, a presence of an obstacle, a frequency of a certain type of object, weather information or other types of environmental information, or a combination thereof.

Also, the surroundings information can include an identification of a target object, and the computing system can be configured to change a current route of the mobile robot or one of the other mobile robots to move towards the target object to sense and analyze the target object with greater accuracy. For example, wherein the target object is a detected person, the computing system can be configured to change a current route of the mobile robot or one of the other mobile robots to move towards the detected person to perform facial recognition or another form of identification of the person with greater accuracy. The computing system can be configured to select the mobile robot or one of the other mobile robots for the change in the current route to move towards the detected person, according to a determination by the computing system as to which mobile robot is closest to the detected person geographically. Also, the computing system can be configured to select the mobile robot or one of the other mobile robots for the change in the current route to move towards the detected person, according to a determination by the computing system as to which mobile robot is able to move to a certain distance from the person within a least amount of time.

In some embodiments, the computing system is configured to generate the self-governing route instructions or route instructions the other mobile robots via self-diagnostic information sensed from at least one sensor of the plurality of sensors. The self-diagnostic information can include internal conditions of the mobile robot including an amount of energy stored in the power system (e.g., see power system 306), energy efficiency of the mobile robot, actuator system (e.g., see actuator system 340), or the locomotion system (e.g., see locomotion system 342), a temperature of one or more sections or parts of the mobile robot, or a combination thereof.

In some embodiments, the computing system is configured to: detect a person not wearing a face mask sensed by at least one sensor of the plurality of sensors; and control an action of the mobile robot according to the detection of the person not wearing a face mask.

As mentioned herein, a mobile robot of the system 100 can include a speaker (e.g., as part of the intercom 322). And, in such embodiments, the robot can also include a near-field communication (NFC) transceiver (e.g., as part of the intercom 322) configured to receive identification information from an NFC tag after a negotiation with the NFC tag. With such a robot of the system 100, the computing system can be configured to output, via the speaker, an audible request for identification information, after the detection of a person sensed by at least one sensor of the plurality of sensors. The computing system can also be configured to provide a security procedure based on stored instructions in the computing system when acceptable identification information is not received by the NFC transceiver within a certain period of time after the audible request for identification information. The security procedure can include the computing system activating an alarm and directing the mobile robot to follow the detected person. On the other hand, when acceptable identification information is received by the NFC transceiver within a certain period of time after the audible request for identification information, the computing system can be configured to: permit remote control of the mobile robot by a mobile application running on a mobile device associated with the acceptable identification information; and receive a route from the mobile device. The computing system can also be configured to control the locomotion system (e.g., see locomotion system 342) to move the mobile robot according to the received route. The received route can be generated according to a path taken by the mobile device and recorded by the mobile device while mobile device was moving along the path.

In some embodiments, a mobile robot of the system 100 can include a power system (e.g., see power system 306), a sensor system (e.g., see front infrared lighting 310, ultrasound sensors 312, front cameras 314, rear cameras 316, rear ultrasound sensors 318, six panoramic 360 degrees cameras 326, and thermal PTZ camera 328), having a plurality of sensors, an actuator system (e.g., see actuator system 340) powered by the power system, having a locomotion system (e.g., see locomotion system 342) configured to move the mobile robot from one location to another location, and a control system having a computing system. The computing system can perform at least part of any of the methods described herein. Also, the computing system can be configured to: detect a person sensed by at least one sensor of the plurality of sensors, match, via a facial recognition system of the computing system, a human face from a digital image or a video frame of the detected person captured by at least one of the plurality of sensors against a database of faces stored in the mobile robot and control an action of the mobile robot according to the matched human face. Also, in such embodiments, the computing system can be configured to: communicate with respective computing systems of other mobile robots via a communications network, and control movement of the mobile robot, via the locomotion system (e.g., see locomotion system 342), according to self-governing route instructions, route instructions communicated from at least one of the other mobile robots, or a combination thereof.

In some embodiments, a mobile robot of the system 100 can include a power system (e.g., see power system 306), a sensor system (e.g., see front infrared lighting 310, ultrasound sensors 312, front cameras 314, rear cameras 316, rear ultrasound sensors 318, six panoramic 360 degrees cameras 326, and thermal PTZ camera 328), having a plurality of sensors, an actuator system (e.g., see actuator system 340) powered by the power system, having a locomotion system (e.g., see locomotion system 342) configured to move the mobile robot from one location to another location, and a control system having a computing system. The computing system in such embodiments can be configured to: detect a person sensed by at least one sensor of the plurality of sensors, match, via a facial recognition system of the computing system, a human face from a digital image or a video frame of the detected person captured by at least one of the plurality of sensors against a database of faces, control an action of the mobile robot according to the matched human face, and control movement of the mobile robot, via the locomotion system according to self-governing route instructions.

In some embodiments of a robot of the system 100, the robot can include a power system (e.g., see power system 306), an actuator system (e.g., see actuator system 340) powered by the power system, having a locomotion system (e.g., see locomotion system 342) configured to move the mobile robot from one location to another location, and a sensor system (e.g., see front infrared lighting 310, ultrasound sensors 312, front cameras 314, rear cameras 316, rear ultrasound sensors 318, six panoramic 360 degrees cameras 326, and thermal PTZ camera 328), having a plurality of sensors. In such embodiments, the plurality of sensors can include a plurality of stereo cameras, and the robot can include a mast (e.g., see surveillance tower 330). The mast can make the height of the mobile robot at least 91 centimeters but no greater than 244 centimeters. With such a robot, at least two stereo cameras of the plurality of stereo cameras can be attached to the mast (e.g., see cameras 326 and 328). Also, the at least two stereo cameras can include at least one infrared camera (e.g., see camera 328). In some embodiments, one or more microphones can be integrated into the mast. For example, the surveillance tower 330 can include one or more microphones.

In such embodiments having the stereo cameras, the plurality of sensors can include a stereo microphone and a pan-tilt-zoom camera (PTZ camera), e.g., see thermal PTZ camera 328. Also, such embodiments can include a control system having a computing system, wherein the computing system is configured to: identify a direction of a sound source sensed by the stereo microphone and control the PTZ camera to face in the direction of the sound source. In such embodiments, the PTZ camera can be at an upper portion of the mast or on a top portion of the mast (e.g., see camera 328 in FIGS. 3 to 11).

In such embodiments having the stereo cameras as well as some other embodiments, the mobile robot can include a body and a container on a top portion of the body (e.g., see container 1102 of robot 1100). This can be very useful for delivery robots of the system 100. With robots having a container, the plurality of sensors can include a sensor configured to detect unauthorized opening of the container. In such embodiments, the computing system can be configured to: receive a destination for delivery of items stowed in the container, and control movement of the mobile robot, via the locomotion system, from a starting point to the destination, according to self-governing route instructions and the received destination. The computing system can be configured to control movement of the mobile robot, via the locomotion system, from the destination to the starting point, according to self-governing route instructions and the received destination.

In such embodiments of the robot having the stereo cameras, at least one stereo camera of the plurality of stereo cameras can include a polarizer. Or, the robot can include a polarizing lens in front of a stereo camera of the plurality of stereo cameras.

In such embodiments of the robot having the stereo cameras, the robot can include a control system having a computing system, wherein the computing system is configured to: communicate with other mobile robots via a communications network, and control movement of the mobile robot, via the locomotion system, according to self-governing route instructions, route instructions communicated from at least one of the other mobile robots, or a combination thereof.

In some embodiments of a mobile robot of the system 100, the robot can have a body, a container on a top portion of the body (e.g., see container 1102), a power system (e.g., see power system 306), an actuator system (e.g., see actuator system 340) powered by the power system, having a locomotion system (e.g., see locomotion system 342) configured to move the mobile robot from one location to another location, and a sensor system (e.g., see front infrared lighting 310, ultrasound sensors 312, front cameras 314, rear cameras 316, rear ultrasound sensors 318, six panoramic 360 degrees cameras 326, and thermal PTZ camera 328), having a plurality of sensors having a sensor configured to detect unauthorized opening of the container. These embodiments do not necessarily have a stereo camera. In such embodiments, a computing system of the robot can be configured to: receive a destination for delivery of items stowed in the container, and control movement of the mobile robot, via the locomotion system, from a starting point to the destination, according to self-governing route instructions and the received destination. Also, the computing system can be configured to control movement of the mobile robot, via the locomotion system, from the destination to the starting point, according to self-governing route instructions.

When the embodiment of the robot has a container, its plurality of sensors can have a plurality of stereo cameras. And, at least one stereo camera of the plurality of stereo cameras can include a polarizer, or the robot can include a polarizing lens in front of a stereo camera of the plurality of stereo cameras. Also, in such embodiments of the robot with a container, the plurality of stereo cameras can include at least one infrared camera. And, in such embodiments, the plurality of sensors can include a stereo microphone and a pan-tilt-zoom camera (PTZ camera), and the computing system can be configured to: identify a direction of a sound source sensed by the stereo microphone and control the PTZ camera to face in the direction of the sound source. The embodiments with a container can also include a mast (e.g., see surveillance tower 330), wherein at least two stereo cameras of the plurality of stereo cameras can be attached to the mast. And, in such embodiments and others the mast makes the height of the mobile robot at least 91 centimeters but no greater than 244 centimeters. the PTZ camera can be at an upper portion of the mast or on a top portion of the mast.

A more complete embodiment of the robot can include a body, a container on a top portion of the body, a power system (e.g., see power system 306), an actuator system (e.g., see actuator system 340) powered by the power system, having a locomotion system (e.g., see locomotion system 342) configured to move the mobile robot from one location to another location, and a sensor system (e.g., see front infrared lighting 310, ultrasound sensors 312, front cameras 314, rear cameras 316, rear ultrasound sensors 318, six panoramic 360 degrees cameras 326, and thermal PTZ camera 328), having a plurality of sensors having a plurality of stereo cameras and a sensor configured to detect unauthorized opening of the container. Such more complete embodiments for useful for deliveries in all sorts of environments and can include a mast (e.g., see surveillance tower 330), wherein at least two stereo cameras of the plurality of stereo cameras are attached to the mast.

Referring back to FIGS. 12 and 13, the group of robots 1200 depicted include first robot 1202 and a second robot 1204 that has solar panels 1206 on a retractable mast, and the panels can include transducers—e.g., thin solar energy panels, piezoelectric sensors for sensing wind speeds, etc. Such functionality in a robot of the system 100 can be useful for exploration, especially space exploration.

A mobile robot of the system 100 that is arranged for exploration (such as the robots 1202 and 1204 shown in FIGS. 12 and 13) can include a locomotion system similar are derived from the locomotion systems already described and illustrated herein (e.g., see locomotion system 342) since the locomotion system is configured to move the mobile robot from one location to another location in exploration. Such a robot that is arranged for exploration can include a container (e.g., see container 1102 and containers 1207 and 1209) that is configured to hold items typical used in exploration of an environment or area (whether on earth or another planet or another body in the solar system such as a moon). For example, the container can be configured to hold a networked sensor. Also, a robot arranged for exploration can include an arm with an end effector (e.g., see arm and end effectors 1208 and 1210). The end effector of an arm can be configured to: grip and move a networked sensor from the container to an area near the mobile robot, and grip and move a networked sensor from an area near the mobile robot to the container. The robot that is arranged for exploration can also include a computing system, configured to: communicate with other mobile robots and networked sensors via a communications network, and control movement of the mobile robot, via the locomotion system according to self-governing route instructions, route instructions communicated from at least one other mobile robot, route instructions communicated from a networked sensor, or a combination thereof. The computing system can also be configured to control the arm and end effector according to self-governing arm instructions, arm instructions communicated from at least one other mobile robot, arm instructions communicated from a networked sensor, or a combination thereof. If the robot is part of a group of robots for exploration (e.g., see FIGS. 12 and 13, wherein a group of robots 1200 include a first robot 1202 and a second robot 1204 for exploration) the robot can include a sail or a retractable sail (e.g., see solar panels 1206 supported by a retractable mast, wherein the sail can include transducers—e.g., thin solar energy panels, piezoelectric sensors for sensing wind speeds, etc.).

In some embodiments, the locomotion system of a robot arranged for exploration can include at least one electric motor and an all-wheel drive system. Actually, any type of robot of the system 100 can be enhanced with a locomotion system that includes at least one electric motor and an all-wheel drive system. In such embodiments, a wheel of the locomotion system can be configured with the all-wheel drive system to rotate forwards or backwards independently of other wheels of the locomotion system.

With a mobile robot of the system 100 that is arranged for exploration (such as the robots 1202 and 1204 shown in FIGS. 12 and 13), the computing system can be configured to: control the arm and the end effector to grip and move a networked sensor from a first area near the mobile robot to the container of the mobile robot, and control the arm and the end effector to grip and move the networked sensor from the container of the mobile robot to a second area near the mobile robot (e.g., see container 1102 and containers 1207 and 1209). Also, such a mobile robot can include a cable with a hook on an end of the cable (e.g., see cable 1212 shown in FIGS. 12 and 13). The mobile robot can also include a winch configured to roll in or roll out the cable to move the hook towards or away from the winch, respectively (e.g., see winches 1214 and 1216). The robot can also include an eye configured to receive the hook or another hook from another mobile robot. In such an embodiment, the arm can be configured to: grip, with its end effector, another hook and cable from another mobile robot, and move the other hook and cable to its eye such that the eye receives the other hook and the mobile robot is connected to the other mobile robot physically via the other hook and cable.

In some embodiments of the mobile robot that is arranged for exploration, the robot can include a gun or sling configured to shoot a solid projectile connected to a wire (e.g., see slings 1218 and 1220). In such embodiments, the arm of the mobile robot can be configured to: grip, with its end effector, another solid projectile and wire from another mobile robot, and move the other solid projectile and wire to a corresponding receiver of the mobile robot such that the corresponding receiver mates with the other solid projectile and the mobile robot is connected to the other mobile robot physically via the other solid projectile and wire (e.g., see wire 1222). These embodiments and others of the robot can include a sensor system (e.g., see front infrared lighting 310, ultrasound sensors 312, front cameras 314, rear cameras 316, rear ultrasound sensors 318, six panoramic 360 degrees cameras 326, and thermal PTZ camera 328) including a plurality of sensors, wherein the plurality of sensors includes a plurality of stereo cameras. And, with such embodiments, the robot can also include a mast (e.g., see surveillance tower 330), wherein at least two stereo cameras of the plurality of stereo cameras are attached at an upper portion or the top of the mast. Also, the at least two stereo cameras can include at least one infrared camera.

Also, the system 100 can be arranged for exploration (such as the robots 1202 and 1204 shown in FIGS. 12 and 13) and can include a plurality of networked mobile robots (e.g., see networked sensors 130 and 132 shown in FIG. 1) and a plurality of networked sensors (e.g., see networked mobile robots 114 to 118 shown in FIG. 1).

A networked mobile robot of the plurality of networked mobile robots, can include a locomotion system (e.g., see locomotion system 342) configured to move the networked mobile robot from one location to another location. The robot can also include a container, configured to hold at least one sensor of the networked sensors. The robot can also include an arm with an end effector configured to: grip and move a networked sensor from the container to an area near the mobile robot, and grip and move a networked sensor from an area near the networked mobile robot to the container (e.g., see arm and end effectors 1208 and 1210). The robot can also include a computing system configured to communicate with other mobile robots of the plurality of networked mobile robots via a communications network (e.g., see network 104). The computing system can also be configured to control movement of the mobile robot, via the locomotion system, according to self-governing route instructions, route instructions communicated from at least one of the other mobile robots, or a combination thereof. The computing system can also be configured to control the arm according to self-governing arm instructions, arm instructions communicated from at least one of the other mobile robots, or a combination thereof.

The locomotion system can include at least one electric motor and an all-wheel drive system. A wheel of the locomotion system can be configured with the all-wheel drive system to rotate forwards or backwards independently of other wheels of the locomotion system.

A networked sensor of the plurality of networked sensors, can include an electrical transducer configured to convert sensed physical qualities into electrical qualities having sensor data corresponding to the sensed physical qualities. The networked sensor can also include a computing system configured to communicate the sensor data to the plurality of networked mobile robots via the communications network and receive instructions from the plurality of networked mobile robots via the communications network. In some embodiments, the computing system of the networked sensor is configured to communicate with other sensors of the plurality of networked sensors via the communications network.

The computing system of the networked mobile robot can be further configured to control the arm and the end effector to grip and move a networked sensor from a first area near the networked mobile robot to the container of the mobile robot. And, the computing system can be further configured to control the arm and the end effector to grip and move the networked sensor from the container of the networked mobile robot to a second area near the mobile robot. Also, the computing system of the networked mobile robot can be configured to: communicate with the plurality of networked sensors via the communications network, and control movement of the mobile robot, via the locomotion system, according to route instructions communicated from at least one of the plurality of networked sensors.

The networked mobile robot of the system can also include: a cable with a hook on an end of the cable (e.g., see cable 1212 shown in FIGS. 12 and 13), a winch configured to roll in or roll out the cable to move the hook towards or away from the winch (e.g., see winches 1214 and 1216), respectively, and an eye configured to receive the hook or another hook from another mobile robot of the plurality of networked mobile robots. An arm of another mobile robot of the plurality of networked mobile robots can be configured to: grip the hook with its end effector and move the hook to its eye such that the eye receives the hook and the networked mobile robot is connected to the other mobile robot physically via the hook and the cable. Also, the networked mobile robot can include a gun or a sling configured to shoot a solid projectile connected to a wire. An arm of another mobile robot of the plurality of networked mobile robots can configured to: grip, with its end effector, the solid projectile after the solid projectile has been shot from the gun or the sling (e.g., see slings 1218 and 1220), and attach the projectile to a receiving part on itself and become connected to the networked mobile robot physically via the solid projectile connected and the wire (e.g., see wire 1222).

Some embodiments can include a mobile robot arranged for exploration having an all-wheel drive system configured to move the mobile robot from one location to another location, a container (e.g., see container 1102 and containers 1207 and 1209), configured to hold a networked sensor, and an arm with an end effector (e.g., see arm and end effectors 1208 and 1210). The arm and the end effector can be configured to: grip and move a networked sensor from the container to an area near the mobile robot, and grip and move a networked sensor from an area near the mobile robot to the container. The robot can also include a computing system, configured to communicate with other mobile robots and networked sensors via a communications network. The computing system can also be configured to control movement of the mobile robot, via the all-wheel drive system, according to self-governing route instructions, route instructions communicated from at least one other mobile robot, route instructions communicated from a networked sensor, or a combination thereof. The computing system can also be configured to control the arm and end effector according to self-governing arm instructions, arm instructions communicated from at least one other mobile robot, arm instructions communicated from a networked sensor, or a combination thereof.

Figure 19:
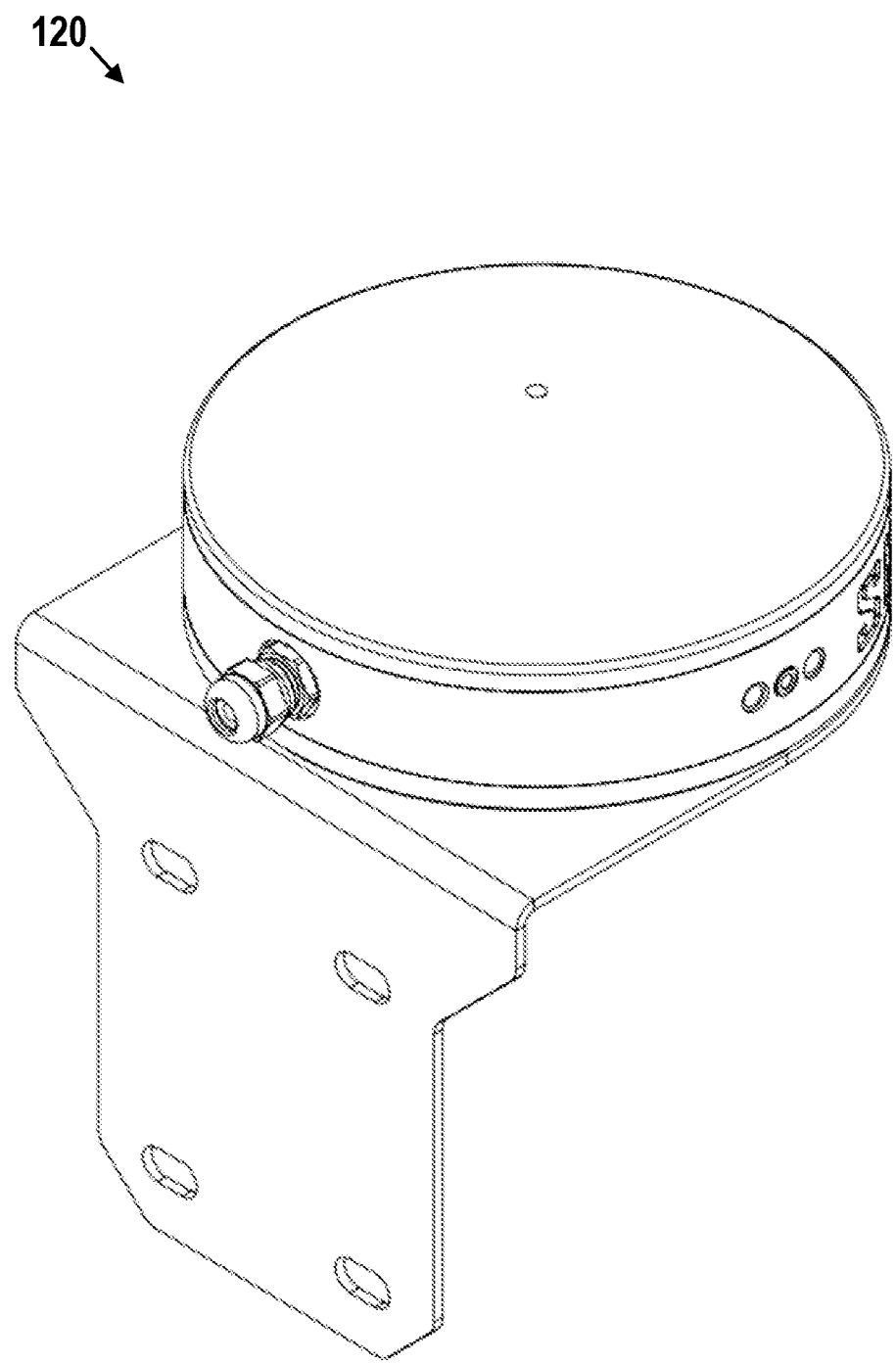

FIGS. 14 and 15 illustrate a front view and a side view of the GPS base station 120, respectively. And, FIG. 19 illustrates a perspective view of the GPS base station 120. The GPS base station is designed to work as a GPS support station to make adjustments in the navigation systems of the computing system 102 and the robots of the system 100. The GPS base station 120 form a real-time flow of corrective data for any model of autonomous mobile for the system 100. The data from the station permits the robots that are located in a certain radius from it to determine their own positions with accuracy. In the system, the base station 120 is configured to be attached to a roof or wall of a build or a stand-alone mast. For when the electricity supply is unstable for the GPS base station 120, it can use additional AC/DC converters to feed power to itself. The GPS base station can interact and communicate with the navigation system that includes the navigation receiver (e.g., see navigation receiver 308).

Figure 17:
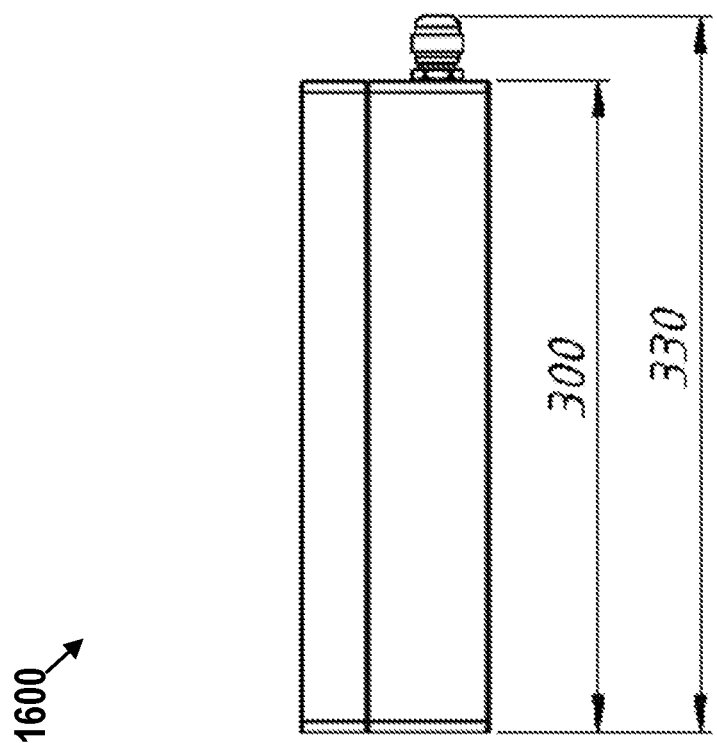
FIGS. 16 and 17 illustrate views of a transmitter for the GPS base station of FIGS. 14, 15, and 19, in accordance with some embodiments of the present disclosure.
Figure 16:
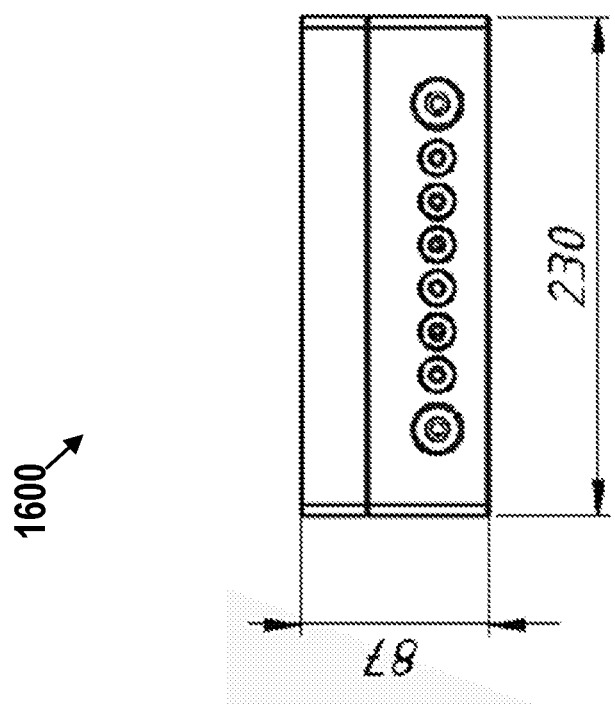

FIGS. 16 and 17 illustrate a rear view and a side view of a transmitter 1600 for the GPS base station 120. It is configured to transmit data from the GPS base station 120 via a network, such as the network 104. The transmitter 1600 also is configured to connect a LAN or WAN for the robots to a stationary video surveillance system, such as via an Ethernet cable. The transmitter 1600 is also configured to copy a robot's video surveillance system archives via a network. The transmitter 1600 supports power over Ethernet at the base station 120. The transmitter 1600 can have a built-in AC/DC converter configured to receive batteries for an uninterruptible power supply for the base station 120.

In some embodiments of the system, a robot can be paired with a rugged remote control unit. And, such a control unit can be designed for a remote control system for a robot of the system 100. The remote control system can be configured for manual control of a robot of the system 100. The remote control system can be used to take a robot off of its existing routes, control and program new routes, and drive the robot to an area for maintenance and repairs. The remote control system can be used from a mobile device via a corresponding mobile app. Or, the remote control system can use the rugged remote control unit. The rugged remote control unit is useful for programing new routes at the setup of a robot. The rugged remote control unit can be configured with a WLAN transceiver that can communicate with a robot from a further distance away from a robot than if using the WLAN transceiver of a typical mobile device, such as a smart phone.

Figure 18:
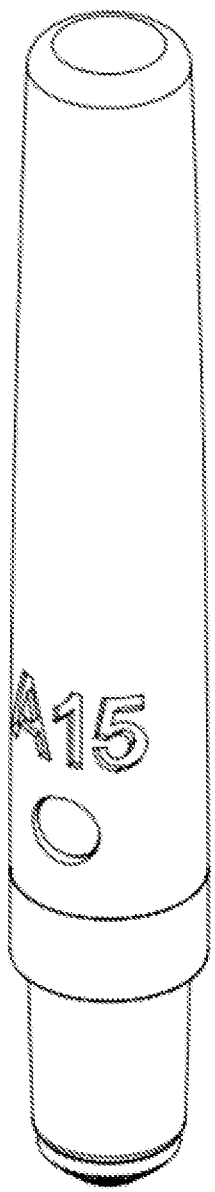
FIG. 18 illustrates a side view of an RFID anchor of the system of FIG. 1, in accordance with some embodiments of the present disclosure.

FIG. 18 illustrates a side view of an RFID anchor 1800. The RFID anchor is configured to provide a local navigation system to a robot of the system 100 when visual navigation or GPS signal is unavailable. The RFID can be deployed at different locations of a patrolled area of the robot. A plurality of the RFID anchors can be deployed (such as four anchors deployed at four corners of a rectangular patrolled area that encompasses a route of the robot). A navigation system of the robot can measure the distances to the RFID anchors from itself, which allows for navigation. The RFID anchor 1800 can be powered by a low-power source, such as a solar cell. The RFID anchor 1800 can include a battery that is configured to power the RFID anchor for its autonomous operation at nighttime.

While the invention has been described in conjunction with the specific embodiments described herein, it is evident that many alternatives, combinations, modifications and variations are apparent to those skilled in the art. Accordingly, the example embodiments of the invention, as set forth herein are intended to be illustrative only, and not in a limiting sense. Various changes can be made without departing from the spirit and scope of the invention.

What is claimed is:

1. A mobile robot, comprising:
   a power system;
   a sensor system, comprising a plurality of sensors comprising front and rear ultrasound sensors, front and rear cameras, and a pan-tilt-zoom camera;
   an actuator system powered by the power system, comprising wheels configured to move the mobile robot from one location to another location;
   a speaker;
   a microphone that comprises a stereo microphone;

a surveillance tower configured to telescope toward a housing of the mobile robot or expand upwards, wherein the pan-tilt-zoom camera integrated on surveillance tower, and wherein the pan-tilt-zoom camera comprises a thermal pan-tilt-zoom camera that is integrated on at an upper portion of the surveillance tower;

a near-field communication (NFC) transceiver configured to receive identification information from an NFC tag after a negotiation with the NFC tag; and a computing system, configured to:
communicate with other mobile robots via a communications network;
control movement of the mobile robot, via the wheels, according to self-governing route instructions and route instructions communicated from at least one of the other mobile robots;
generate the self-governing route instructions via machine learning, deep learning, or a combination thereof;
generate the self-governing route instructions according to surroundings information sensed from at least one sensor of the plurality of sensors, wherein the surroundings information comprises an identification of a target object;
change a current route of the mobile robot to move towards the target object to sense and analyze the target object with greater accuracy according to at least the self-governing route instructions, and when the target object is a detected person, the computing system is further configured to change a current route of the mobile robot or one of the other mobile robots to move towards the detected person to perform facial recognition or another form of identification of the detected person with greater accuracy;
select the mobile robot or one of the other mobile robots for the change in the current route to move towards the detected person, according to a determination by the computing system as to which mobile robot is closest to the detected person geographically;
identify a direction of a sound source sensed by the microphone and control the pan-tilt-zoom camera to face in the direction of the sound source;
output, via the speaker, an audible request for identification information, after a detection of a person sensed by at least one sensor of the plurality of sensors; and
provide a security procedure based on stored instructions in the computing system, when acceptable identification information is not received by the NFC transceiver within a certain period of time after the audible request for identification information, wherein the security procedure comprises the computing system activating an alarm and directing the mobile robot to follow the detected person.

2. The mobile robot of claim 1, wherein route instructions for the mobile robot and the other mobile robots are communicated via the communications network, and wherein the communications network comprises the mobile robot and the other mobile robots as nodes of the communications network.

3. The mobile robot of claim 1, wherein the surroundings information comprises a distance to a new route or a specific geographic location, a presence of an obstacle, and weather information.

4. The mobile robot of claim 1, wherein the computing system is configured to generate the self-governing route instructions via self-diagnostic information sensed from at least one sensor of the plurality of sensors, and wherein the self-diagnostic information comprises internal conditions of the mobile robot including an amount of energy stored in the power system, energy efficiency of the mobile robot, actuator system, or the wheels, a temperature of one or more sections or parts of the mobile robot, or a combination thereof.

5. The mobile robot of claim 1, wherein the computing system is configured to:
detect a person not wearing a face mask sensed by at least one sensor of the plurality of sensors; and
control an action of the mobile robot according to the detection of the detected person not wearing a face mask.

6. The mobile robot of claim 1, wherein when acceptable identification information is received by the NFC transceiver within a certain period of time after the audible request for identification information, the computing system is configured to:
permit remote control of the mobile robot by a mobile application running on a mobile device associated with the acceptable identification information;
receive a route from the mobile device; and
control the wheels to move the mobile robot according to the received route,
wherein the received route is generated according to a path taken by the mobile device and recorded by the mobile device while mobile device was moving along the path.

7. A mobile robot, comprising:
a power system;
a sensor system, comprising a plurality of sensors comprising front and rear ultrasound sensors, front and rear cameras, and a pan-tilt-zoom camera;
an actuator system powered by the power system, comprising a powertrain and wheels driven by the powertrain configured to move the mobile robot from one location to another location;
a speaker;
a microphone that comprises a stereo microphone;
a surveillance tower configured to telescope toward a housing of the mobile robot or expand upwards, wherein the pan-tilt-zoom camera integrated on surveillance tower, and wherein the pan-tilt-zoom camera comprises a thermal pan-tilt-zoom camera that is integrated on at an upper portion of the surveillance tower;
a near-field communication (NFC) transceiver configured to receive identification information from an NFC tag after a negotiation with the NFC tag; and
a computing system, the computing system configured to:
communicate with other mobile robots via a communications network;
control movement of the mobile robot, via the powertrain and the wheels, according to self-governing route instructions and route instructions communicated from at least one of the other mobile robots;
generate the self-governing route instructions via machine learning, deep learning, or a combination thereof;
generate the self-governing route instructions according to surroundings information sensed from at least one sensor of the plurality of sensors, wherein the surroundings information comprises an identification of a target object;
change a current route of the mobile robot to move towards the target object to sense and analyze the target object with greater accuracy according to at least the self-governing route instructions, and when the target object is a detected person, the computing system is further configured to change a current route of the mobile robot or one of the other mobile robots to move towards the detected person to perform facial recognition or another form of identification of the detected person with greater accuracy;

select the mobile robot or one of the other mobile robots for the change in the current route to move towards the detected person, according to a determination by the computing system as to which mobile robot is closest to the detected person geographically;

identify a direction of a sound source sensed by the microphone and control the pan-tilt-zoom camera to face in the direction of the sound source;

output, via the speaker, an audible request for identification information, after a detection of a person sensed by at least one sensor of the plurality of sensors; and provide a security procedure based on stored instructions in the computing system, when acceptable identification information is not received by the NFC transceiver within a certain period of time after the audible request for identification information, wherein the security procedure comprises the computing system activating an alarm and directing the mobile robot to follow the detected person.

8. A mobile robot, comprising:

a power system;

a sensor system, comprising a plurality of sensors comprising front and rear ultrasound sensors, front and rear cameras, and a pan-tilt-zoom camera;

an actuator system powered by the power system, comprising a locomotion system configured to move the mobile robot from one location to another location;

a speaker;

a microphone that comprises a stereo microphone;

a surveillance tower configured to telescope toward a housing of the mobile robot or expand upwards, wherein the pan-tilt-zoom camera integrated on surveillance tower, and wherein the pan-tilt-zoom camera comprises a thermal pan-tilt-zoom camera that is integrated on an upper portion of the surveillance tower;

a near-field communication (NFC) transceiver configured to receive identification information from an NFC tag after a negotiation with the NFC tag; and a computing system, the computing system configured to:
  communicate with other mobile robots via a communications network;
  control movement of the mobile robot, via the locomotion system, according to self-governing route instructions and route instructions communicated from at least one of the other mobile robots;
  generate the self-governing route instructions via machine learning, deep learning, or a combination thereof;
  generate the self-governing route instructions according to surroundings information sensed from at least one sensor of the plurality of sensors, wherein the surroundings information comprises an identification of a target object;
  change a current route of the mobile robot to move towards the target object to sense and analyze the target object with greater accuracy according to at least the self-governing route instructions, and when the target object is a detected person, the computing system is further configured to change a current route of the mobile robot or one of the other mobile robots to move towards the detected person to perform facial recognition or another form of identification of the detected person with greater accuracy;
  select the mobile robot or one of the other mobile robots for the change in the current route to move towards the detected person, according to a determination by the computing system as to which mobile robot is able to move to a certain distance from the detected person within the least amount of time;
  identify a direction of a sound source sensed by the microphone and control the pan-tilt-zoom camera to face in the direction of the sound source;
  output, via the speaker, an audible request for identification information, after a detection of a person sensed by at least one sensor of the plurality of sensors; and
  provide a security procedure based on stored instructions in the computing system, when acceptable identification information is not received by the NFC transceiver within a certain period of time after the audible request for identification information, wherein the security procedure comprises the computing system activating an alarm and directing the mobile robot to follow the detected person.

9. The mobile robot of claim 7, wherein route instructions for the mobile robot and the other mobile robots are communicated via the communications network, and wherein the communications network comprises the mobile robot and the other mobile robots as nodes of the communications network.

10. The mobile robot of claim 7, wherein the surroundings information comprises a distance to a new route or a specific geographic location, a presence of an obstacle, and weather information.

11. The mobile robot of claim 7, wherein the computing system is configured to generate the self-governing route instructions via self-diagnostic information sensed from at least one sensor of the plurality of sensors, and wherein the self-diagnostic information comprises internal conditions of the mobile robot including an amount of energy stored in the power system, energy efficiency of the mobile robot, actuator system, or the wheels, a temperature of one or more sections or parts of the mobile robot, or a combination thereof.

12. The mobile robot of claim 7, wherein the computing system is configured to:
  detect a person not wearing a face mask sensed by at least one sensor of the plurality of sensors; and
  control an action of the mobile robot according to the detection of the detected person not wearing a face mask.

13. The mobile robot of claim 7, wherein when acceptable identification information is received by the NFC transceiver within a certain period of time after the audible request for identification information, the computing system is configured to:
  permit remote control of the mobile robot by a mobile application running on a mobile device associated with the acceptable identification information;
  receive a route from the mobile device; and
  control the wheels to move the mobile robot according to the received route, wherein the received route is generated according to a path taken by the mobile device and recorded by the mobile device while mobile device was moving along the path.

14. The mobile robot of claim 8, wherein route instructions for the mobile robot and the other mobile robots are communicated via the communications network, and wherein the communications network comprises the mobile robot and the other mobile robots as nodes of the communications network.

15. The mobile robot of claim 8, wherein the surroundings information comprises a distance to a new route or a specific geographic location, a presence of an obstacle, and weather information.

16. The mobile robot of claim 8, wherein the computing system is configured to generate the self-governing route instructions via self-diagnostic information sensed from at least one sensor of the plurality of sensors, and wherein the self-diagnostic information comprises internal conditions of the mobile robot including an amount of energy stored in the power system, energy efficiency of the mobile robot, actuator system, or the locomotion system, a temperature of one or more sections or parts of the mobile robot, or a combination thereof.

17. The mobile robot of claim 8, wherein the computing system is configured to:

detect a person not wearing a face mask sensed by at least one sensor of the plurality of sensors; and control an action of the mobile robot according to the detection of the detected person not wearing a face mask.

18. The mobile robot of claim 8, wherein when acceptable identification information is received by the NFC transceiver within a certain period of time after the audible request for identification information, the computing system is configured to:

permit remote control of the mobile robot by a mobile application running on a mobile device associated with the acceptable identification information;

receive a route from the mobile device; and control the locomotion system to move the mobile robot according to the received route, wherein the received route is generated according to a path taken by the mobile device and recorded by the mobile device while mobile device was moving along the path.

19. The mobile robot of claim 1, wherein the computing system is part of a control system and communicative with a remote control system.

20. The mobile robot of claim 7, wherein the computing system is part of a control system and communicative with a remote control system.

* * * * *